United States Patent
Chen et al.

(10) Patent No.: US 11,146,810 B2
(45) Date of Patent: Oct. 12, 2021

(54) DECODER-SIDE MOTION VECTOR REFINEMENT

(71) Applicant: QUALCOMM Incorporated, San Diego, CA (US)

(72) Inventors: Chun-Chi Chen, San Diego, CA (US); Wei-Jung Chien, San Diego, CA (US); Chao-Hsiung Hung, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/695,907

(22) Filed: Nov. 26, 2019

(65) Prior Publication Data

US 2020/0169748 A1  May 28, 2020

Related U.S. Application Data

(60) Provisional application No. 62/771,960, filed on Nov. 27, 2018.

(51) Int. Cl.
 *H04N 11/02* (2006.01)
 *H04N 19/513* (2014.01)
 (Continued)

(52) U.S. Cl.
 CPC ......... *H04N 19/521* (2014.11); *H04N 19/117* (2014.11); *H04N 19/139* (2014.11);
 (Continued)

(58) Field of Classification Search
 CPC .................................................... H04N 19/521
 (Continued)

(56) References Cited

U.S. PATENT DOCUMENTS

| 2009/0175334 A1* | 7/2009 | Ye | H04N 19/46 375/240.12 |
| 2009/0268823 A1* | 10/2009 | Dane | H04N 19/132 375/240.27 |

(Continued)

FOREIGN PATENT DOCUMENTS

| WO | 2019072422 A1 | 4/2019 |
| WO | 2019089933 A1 | 5/2019 |

OTHER PUBLICATIONS

"Bilateral Filter", Wikipedia, Feb. 10, 2020, pp. 1-5.
(Continued)

*Primary Examiner* — Leron Beck
(74) *Attorney, Agent, or Firm* — Shumaker & Sieffert, P.A.

(57) ABSTRACT

A video coding device, such as a video encoder or video decoder, may determine that a block of video data has at least one of a width less than 8 pixels, a height less than 8 pixels, or the width and the height being equal to 8 pixels; in response, determine that the block is not coded using decoder-side motion vector refinement (DMVR); and code the block without performing DMVR for the block. The video coding device may determine that a second block of video data has a size of at least 8×N or N×8, wherein N is an integer value greater than 8, in response to determining that the second block of video data has the size of at least 8×N or N×8, and then determine whether to code the second block using DMVR.

37 Claims, 18 Drawing Sheets

(51) Int. Cl.
  *H04N 19/117* (2014.01)
  *H04N 19/139* (2014.01)
  *H04N 19/176* (2014.01)
  *H04N 19/44* (2014.01)
  *H04N 19/577* (2014.01)

(52) U.S. Cl.
  CPC ........... *H04N 19/176* (2014.11); *H04N 19/44* (2014.11); *H04N 19/577* (2014.11)

(58) Field of Classification Search
  USPC ....................................... 375/240.01–240.29
  See application file for complete search history.

(56) References Cited

U.S. PATENT DOCUMENTS

| | | | | |
|---|---|---|---|---|
| 2017/0339405 | A1* | 11/2017 | Wang | H04N 19/593 |
| 2018/0041769 | A1* | 2/2018 | Chuang | H04N 19/44 |
| 2018/0184117 | A1* | 6/2018 | Chen | H04N 19/109 |
| 2018/0192071 | A1* | 7/2018 | Chuang | H04N 19/517 |
| 2018/0332298 | A1* | 11/2018 | Liu | H04N 19/577 |
| 2018/0359483 | A1 | 12/2018 | Chen et al. | |
| 2019/0020895 | A1* | 1/2019 | Liu | H04N 19/176 |
| 2019/0132606 | A1* | 5/2019 | Su | H04N 19/176 |
| 2019/0230350 | A1* | 7/2019 | Chen | H04N 19/573 |
| 2019/0238883 | A1 | 8/2019 | Chen et al. | |
| 2020/0036997 | A1* | 1/2020 | Li | H04N 19/577 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

C-H Hung (Qualcomm), et al., "CE9: BIO Gradient Calculation Improvement (Test 9.5.4)", 11. JVET Meeting, Jul. 11, 2018-Jul. 18, 2018, Ljubljana, (The Joint Video Exploration Team of ISO/IEC JTC1/SC29/WG11 and ITU-T SG.16), No. JVET-K0119, Jul. 3, 2018 (Jul. 3, 2018), XP030198791, 3 Pages, Retrieved from the Internet: URL: http://phenix.int-evry.fr/jvet/doc_end_user/documents/11_Ljubljana/wg11/JVET-K0119-v2.zip JVET-K0119_V1.doc [retrieved on Jul. 3, 2018], Sections 1 and 2.

Chen C., et al., "CE9: Removal of 4xN/8x8 CUs and Boundary Padding Process from DMVR (Test 9.1.1)", Joint Video Experts Team (JVET) of ITU-T SG 16 WP 3 and ISO/IEC JTC 1/SC 29/WG 11, JVET-N0407-V2, 14th Meeting: Geneva, CH, Mar. 19-27, 2019, Qualcomm Inc, pp. 1-8.

Chen C., et al., "Generalized Bi-Prediction for Inter Coding", Joint Video Experts Team (JVET) of ITU-T SG 16 WP 3 and ISO/IEC JTC 1/SC 29/WG 11, JVET-C0047 r1, 3rd Meeting: Geneva, CH, May 26-Jun. 1, 2016, pp. 1-4.

Chen et al., U.S. Appl. No. 62/771,986, filed Nov. 27, 2018.

Chen J, et al., "Algorithm Description for Versatile Video Coding and Test Model 2 (VTM 2)", 11. JVET Meeting, Jul. 11, 2018-Jul. 18, 2018, Ljubljana, (The Joint Video Exploration Team of ISO/IEC JTC1/SC29/WG11 and ITU-TSG.16), No. JVET-K1002-v1, Aug. 10, 2018 (Aug. 10, 2018), XP030193537, 19 Pages, Retrieved from the Internet: URL: http://phenix.int-evry.fr/jvet/doc_end_user/documents/11_Ljubljana/wg11/JVET-K1002-v1.zip JVET-K1002-v1.docx, [retrieved on Aug. 10, 2018], Sections 1-3, figure 1.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Chen X., et al., "CE 4: Merge Offset Extension (Test 4.4.8)", Joint Video Experts Team (JVETt) of ITU-T SG 16 WP 3 and ISO/IEC JTC 1/SC 29/WG 11, JVET-L0176, HiSilicon Technologies Co., Ltd, Oct. 3-12, 2018, pp. 1-6.

Ergen S., "ZigBee/IEEE 802.15.4 Summary", Sep. 10, 2004, 37 Pages.

Esenlik (Huawei) S, et al., "CE9: Report on the Results of Tests CE9.2.15 and CE9.2.16", 12. JVET Meeting, Oct. 3, 2018-Oct. 12, 2018, Macao, (The Joint Video Exploration Team of ISO/IEC JTC1/SC29/WG11 and ITU-T SG.16) No. JVET-L0163, Sep. 24, 2018 (Sep. 24, 2018), XP030193690, Retrieved from the Internet: URL: http://phenix.int-evry.fr/jvet/doc_end_user/documents/12_Macao/wg11/JVET-L0163-v1.zip JVET-L0163.docx, [retrieved on Sep. 24, 2018], Section 2.1.

He K., et al., "Guided Image Filtering," IEEE Transactions on Pattern Analysis and Machine Intelligence, vol. 35, No. 6, Jun. 2013, 13 Pages.

IEEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/MAN Standards Committee; IEEE Standard 802.11acTM-2013, Published on Dec. 18, 2013, 425 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Jeong S., et al., "CE4 Ultimate Motion Vector Expression (Test 4.5.4)", Joint Video Experts Team (JVET) of ITU-T SG 16 WP 3 and ISO/IEC JTC 1/SC 29/WG 11, JVET-L0054-r2, Oct. 3-12, 2018, pp. 1-6.

Liu (Bytedance) H, et al., "CE9: Simplification of Decoder Side Motion Vector Derivation (Test 9.2.9)", 12. JVET Meeting, Oct. 3, 2018-Oct. 12, 2018, Macao, (The Joint Video Exploration Team of ISO/IEC JTC1/SC29/WG11 and ITU-T SG.16) No. JVET-L0267-v1, Sep. 25, 2018 (Sep. 25, 2018), XP030193804, pp. 1-4, Retrieved from the Internet: URL: http://phenix.int-evry.fr/jvet/doc_end_user/documents/12_Macao/wg11/JVET-L0267-v1.zip JVET-L0267.docx [retrieved on Sep. 25, 2018], abstract Sections 1-3.

Partial International Search Report—PCT/US2019/063673—ISA/EPO—dated Mar. 4, 2020.

Sethuraman "CE9:Results of DMVR related Test CE9.2.1 and CE92.2," JVET-M0147 Joint Video Experts Team (JVET) of ITU-T SG 16 WP 3 and ISO/IEC JTC 1/SC 29/WG 11, Jan. 2019, 12 Pages.

Sethuraman S., et al., "Decoder Side MV Refinement/Derivation with CTB-level Concurrency and other Normative Complexity Reduction Techniques", Joint Video Experts Team (JVET) of ITU-T SG 16 WP 3 and ISO/IEC JTC 1/SC 29/WG 11, JVET-K0041-v2, Jul. 10-18, 2018, 9 pages.

Skrede O-J., "Image Filtration I", Feb. 22, 2017 (Feb. 22, 2017), XP055671135, 88 Pages, Retrieved from the Internet: URL: https://www.uio.no/studier/emner/matnat/ifi/INF2310/v17/undervisningsmateriale/slides_inf2319_s17_week06.pdf [retrieved on Feb. 24, 2020] slides 25-37, 52-54.

Su Y-C., et al., "CE4.4.1: Generalized Bi-Prediction for Inter Coding", 11th Meeting: Ljubljana, SI, Jul. 10-18, 2018, (The Joint Video Exploration Team of ISO/IEC JTC1/SC29/WG11 and ITU-T SG.16), No. JVET-K0248-V1, MediaTek Inc, pp. 1-4.

(56) References Cited

OTHER PUBLICATIONS

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.

"Sum of absolute transformed differences", Wikipedia, Feb. 10, 2020, pp. 1-2.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

International Search Report and Written Opinion—PCT/US2019/063673—ISAEPO—dated Jun. 24, 2020.

\* cited by examiner

DECODER-SIDE MOTION VECTOR REFINEMENT

This application claims the benefit of U.S. Provisional Application No. 62/771,960, filed Nov. 27, 2018, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for improving decoder-side motion vector refinement (DMVR). It may be applied to any of the existing video codecs, such as HEVC (High Efficiency Video Coding) or VVC (Versatile Video Coding), or be an efficient coding tool in any future video coding standards. For example, video coding devices, such as a video encoder and a video decoder, may be configured with a restriction on block sizes on which to perform DMVR. In particular, if a block has a width or height less than 8 pixels, or a size equal to 8×8 pixels, DMVR may be avoided. Otherwise, for blocks having sizes of at least 8×N or N×8, where N is an integer greater than 8, DMVR may be performed.

In one example, a method of coding video data includes determining that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determining that the block is not coded using decoder-side motion vector refinement (DMVR); and in response to determining that the block is not coded using DMVR, coding the block without performing DMVR for the block.

In another example, a device for coding video data includes a memory configured to store video data; and one or more processors implemented in circuitry and configured to: determine that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determine that the block is not coded using decoder-side motion vector refinement (DMVR); and in response to determining that the block is not coded using DMVR, code the block without performing DMVR for the block.

In another example, a computer-readable storage medium has stored thereon instructions that, when executed, cause a processor to determine that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determine that the block is not coded using decoder-side motion vector refinement (DMVR); and in response to determining that the block is not coded using DMVR, code the block without performing DMVR for the block.

In another example, a device for coding video data includes means for determining that a block of video data has at least one of a width less than 8 pixels, a height less than 8 pixels, or the width and the height being equal to 8 pixels; means for determining that the block is not coded using decoder-side motion vector refinement (DMVR) in response to determining that the block of video data has the at least one of the width less than 8 pixels, the height less than 8 pixels, or the width and the height being equal to 8 pixels; and means for coding the block without performing DMVR for the block in response to determining that the block is not coded using DMVR.

The details of one or more examples are set forth in the accompanying drawings and the description below. Other features, objects, and advantages will be apparent from the description, drawings, and the claims.

DETAILED DESCRIPTION

Figure 1B:
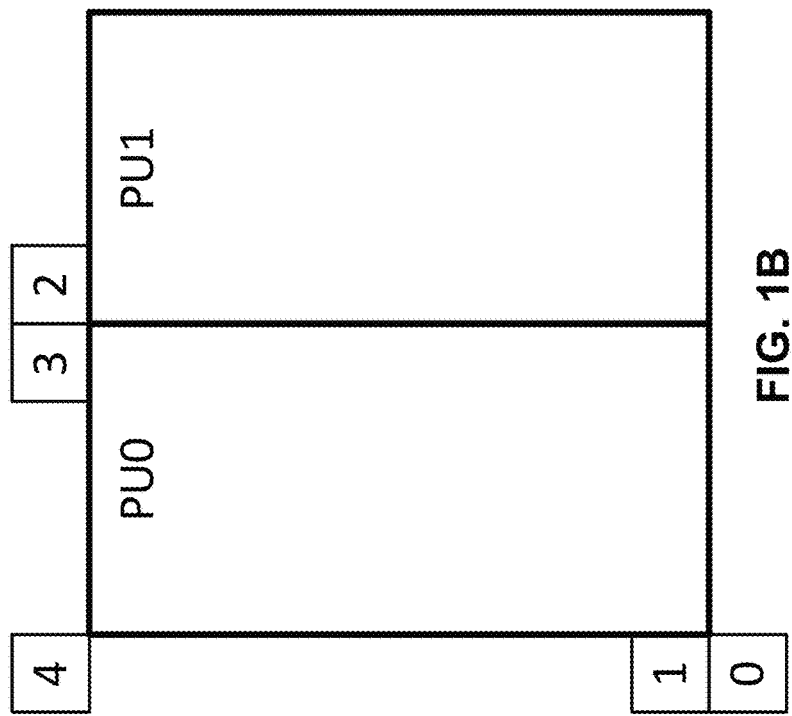
FIGS. 1A and 1B are conceptual diagrams illustrating spatial neighboring candidates for motion vector prediction.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC), and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC draft specification, referred to as HEVC WD hereinafter, is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 7 (JEM 7), can be downloaded from jvet.hhi.fraunhofer.de/svn/svn_HMJEMSoftware/tags/HM-16.6-JEM-7.0/. An algorithm description of JEM 7 is available from phenix.it-sudparis.eu/jvet/doc_end_user/current_document.php?id=3286.

In HEVC, the largest coding unit in a slice is called a coding tree block (CTB) or coding tree unit (CTU). A CTB contains a quadtree the nodes of which are coding units. The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e., inter or intra. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter coded, each PU has one set of motion information, which is derived with a unique inter prediction mode.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Figure 1A:
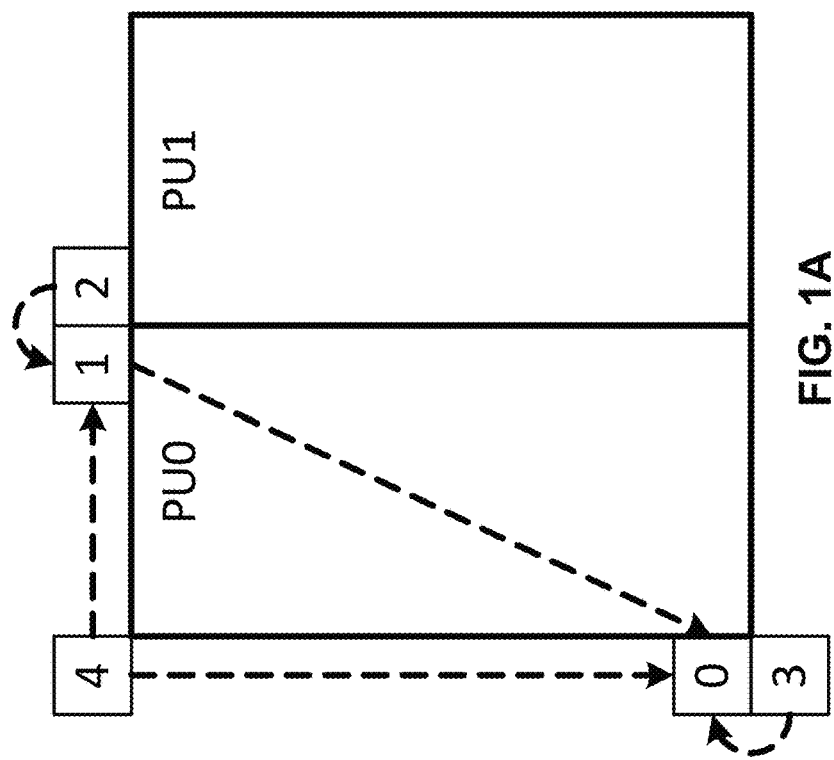

FIGS. 1A and 1B are conceptual diagrams illustrating spatial neighboring candidates for motion vector prediction. In particular, FIG. 1A illustrates examples of spatial neighboring candidates for merge mode, while FIG. 1B illustrates examples of spatial neighboring candidates for advanced motion vector prediction (AMVP) mode. Spatial MV candidates are derived from the neighboring blocks shown in FIGS. 1A and 1B, for a specific PU (PU0), although the methods for generating the candidates from the blocks differ for merge and AMVP modes. In merge mode of HEVC, up to four spatial MV candidates can be derived with the orders shown in FIG. 1A with numbers, and the order is the following: left (0, A1), above (1, B1), above right (2, B0), below left (3, A0), and above left (4, B2).

In AVMP mode, the neighboring blocks are divided into two groups: a left group including blocks 0 and 1, and an above group including blocks 2, 3, and 4 as shown in FIG. 1B. For each group, the potential candidate in a neighboring block referring to the same reference picture as that indicated by the signaled reference index has the highest priority to be chosen to form a final candidate of the group. It is possible that not all neighboring blocks contain a motion vector pointing to the same reference picture. Therefore, if such a candidate cannot be found, the first available candidate will be scaled to form the final candidate; thus, the temporal distance differences can be compensated.

Figure 2B:
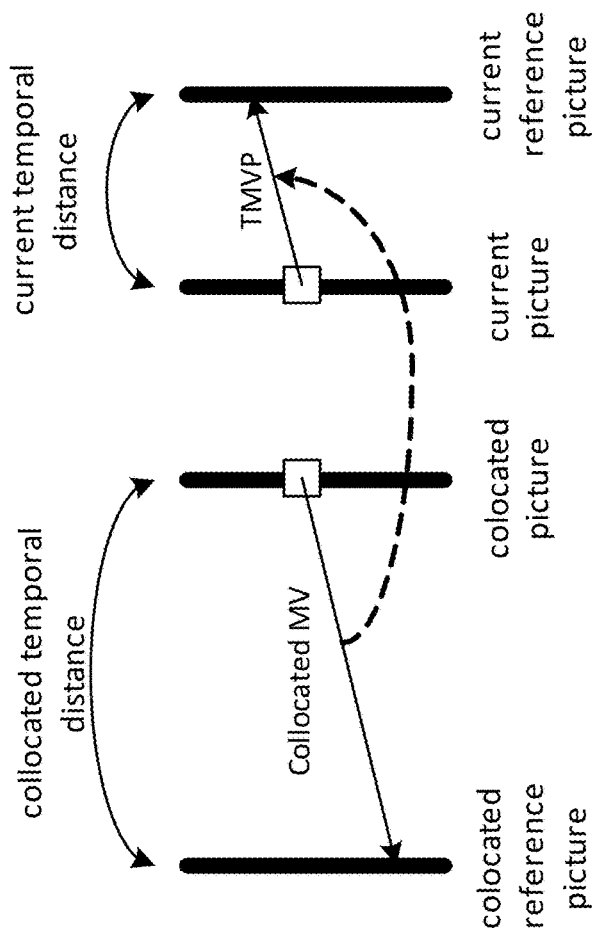
FIGS. 2A and 2B are conceptual diagrams illustrating temporal motion vector prediction.
Figure 2A:
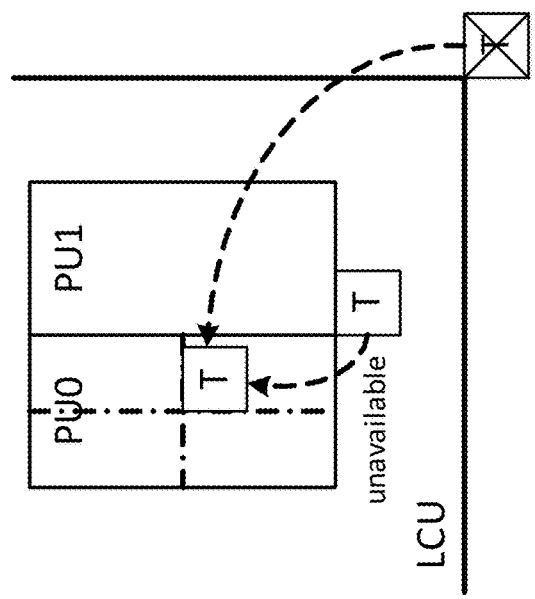

FIGS. 2A and 2B are conceptual diagrams illustrating temporal motion vector prediction. In particular, FIG. 2A depicts a temporal motion vector prediction (TMVP) candidate, while FIG. 2B depicts motion vector scaling. A TMVP candidate, if enabled and available, may be added into the MV candidate list after spatial motion vector candidates in HEVC. The process of motion vector derivation for TMVP candidate is the same for both merge and AMVP modes. However, the target reference index for the TMVP candidate in the merge mode is always set to 0 per HEVC.

The primary block location for TMVP candidate derivation is the bottom right block outside of the collocated PU as shown in FIG. 2A as a block "T", to compensate the bias to the above and left blocks used to generate spatial neighboring candidates. However, if that block is located outside of the current CTB row or motion information is not available, the block may be substituted with a center block of the PU.

A motion vector for the TMVP candidate may be derived from the co-located PU of the co-located picture, indicated in the slice level. The motion vector for the co-located PU is called the collocated MV. Similar to temporal direct mode in AVC, to derive the TMVP candidate motion vector, the co-located MV may need to be scaled to compensate the temporal distance differences, as shown in FIG. 2B.

Figure 3A:
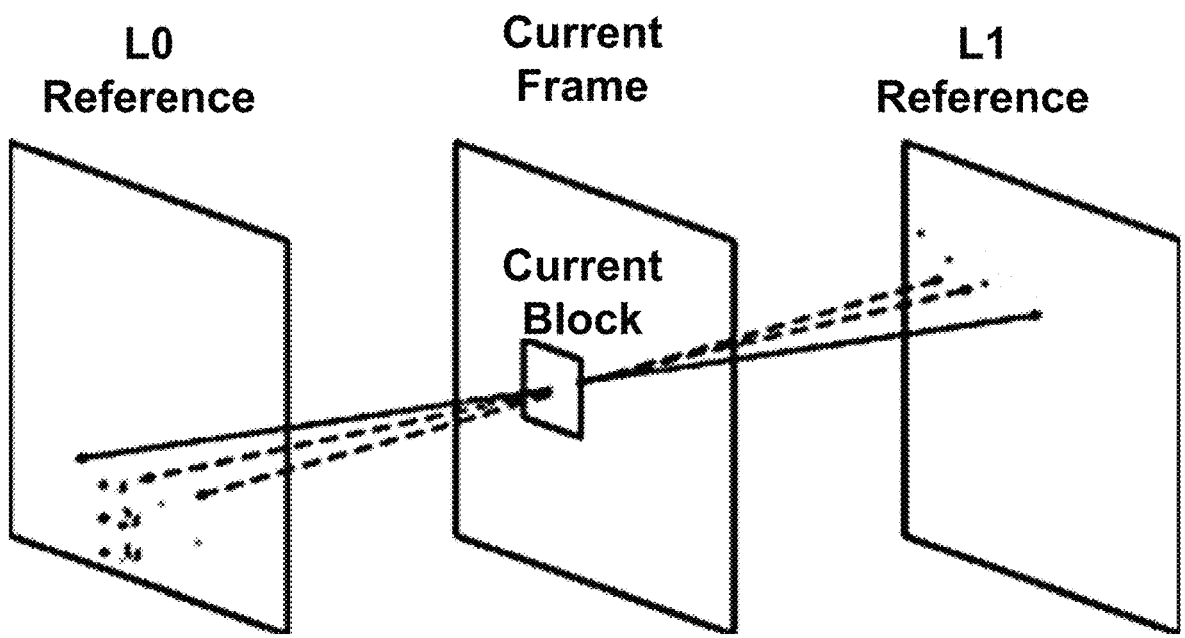
FIGS. 3A and 3B are conceptual diagrams representing merge motion vector refinement.
Figure 3B:
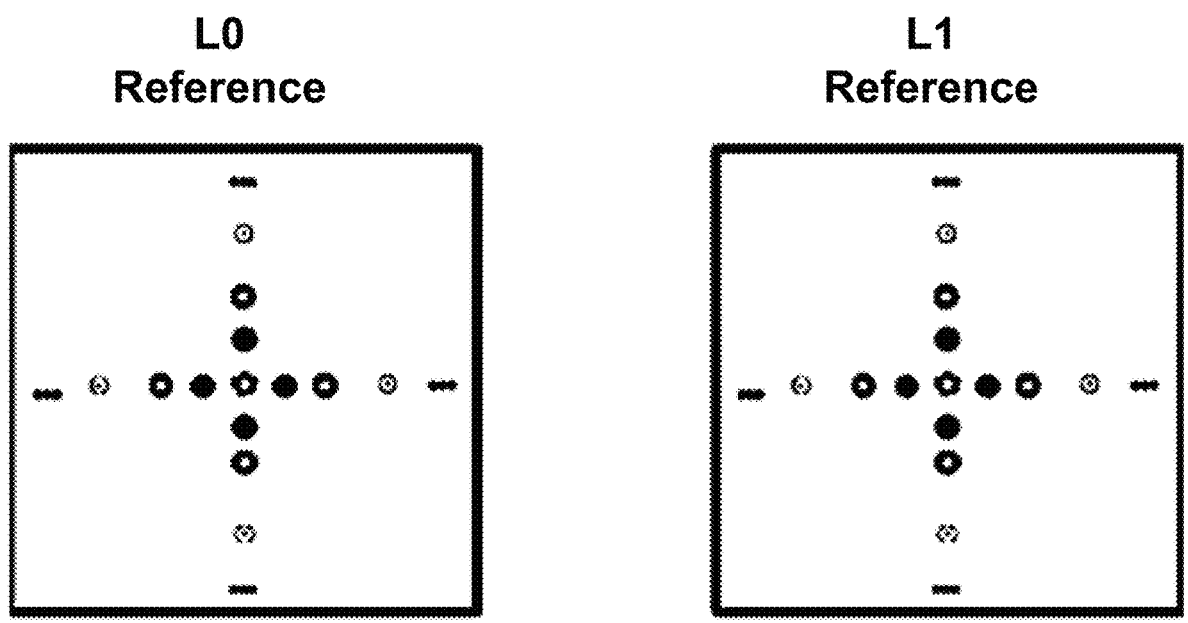

FIGS. 3A and 3B are conceptual diagrams representing merge motion vector refinement. In JVET-L0054, Merge Motion Vector Refinement (MMVR, a.k.a. Ultimate Motion Vector Expression, UMVE) is presented to refine motion vectors of Merge candidates based on signaled motion vector difference. MMVR provides an alternative motion vector expression with simplified signaling, including starting point, motion magnitude, and motion direction. The merge motions can be refined using one of the depicted offsets in FIG. 3B on the cross-shape pattern centered at the location pointed to by unrefined merge motion vectors. In addition, the MV offset (i.e., refined MV minus original MV) pointing to the reference picture in List L0 is scaled to the reference picture in List L1.

Figure 4:
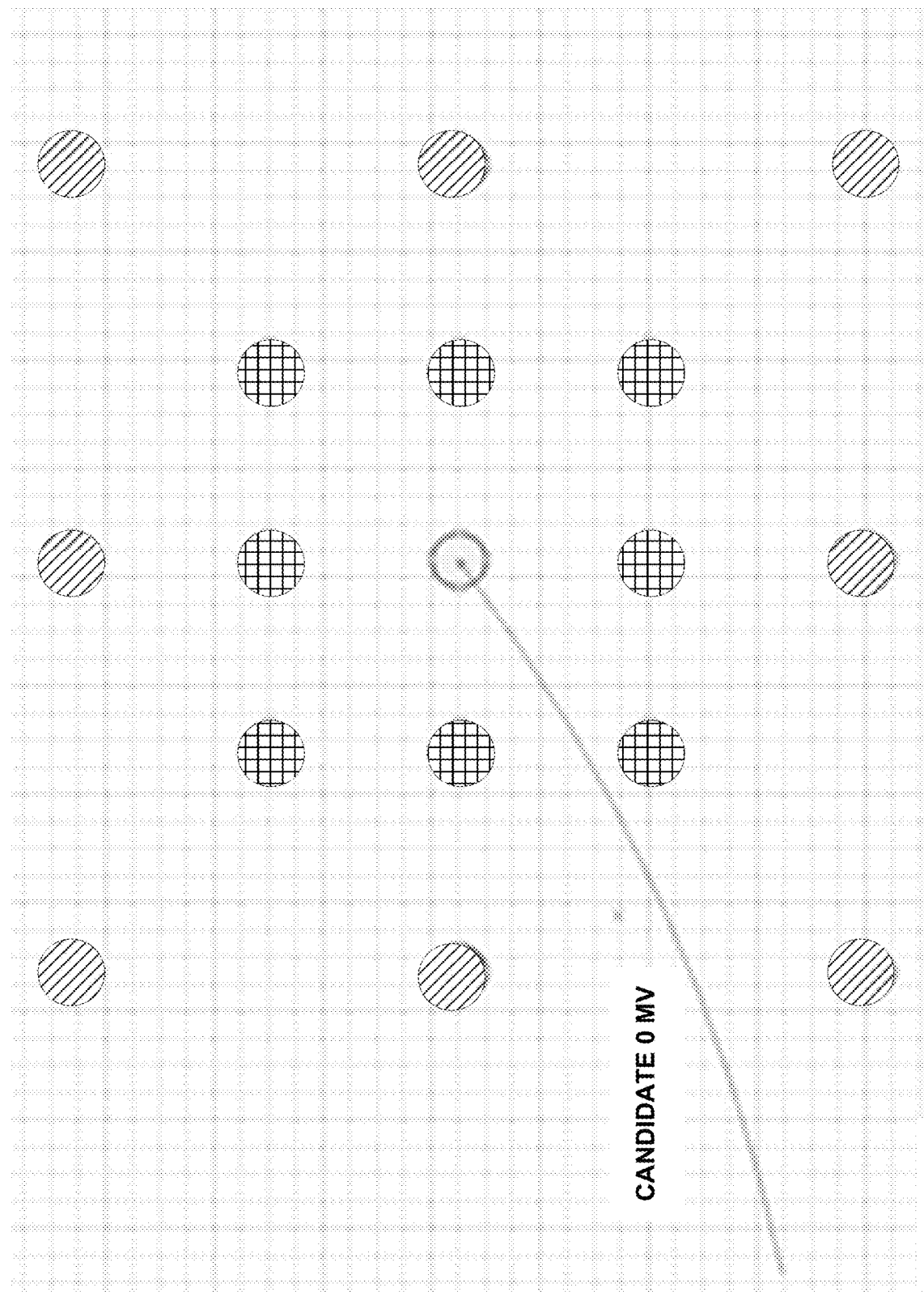
FIG. 4 is a conceptual diagram illustrating examples of offset merge candidates.

FIG. 4 is a conceptual diagram illustrating examples of offset merge candidates. In JVET-L0176, new extended MV offset candidates are constructed based on the first candidate of merge candidate list. New extended MV offset candidates only have MV offset to the current MV of the first candidate and other prediction information is the same as the first candidate. The newly added candidates are pushed into the merge candidate list after the temporal candidate. The supported motion vector offsets are depicted in FIG. 4, including the horizontal and vertical shaded points with offsets (0 or ±1, 0 or ±1) and diagonal shaded points with offsets (0 or ±2, 0 or ±2).

For bi-prediction with one MV (i.e., MV0) from a reference picture in the past and another (i.e., MV1) from a reference picture in the future case, a video coder may add the selected MV offset to first candidate MV0, and add the reverse MV offset to first candidate MV1. In other bi-prediction cases, the video coder may add the same MV offset to the first candidate MV0 and MV1 respectively.

History-based motion vector prediction (HMVP) (described in JVET-K0104) is a history-based method that allows each block to find its MV predictor from a list of MVs decoded from the past in addition to those in immediately adjacent causal neighboring motion fields. A table with multiple HMVP candidates is maintained during the encoding/decoding process. The table is emptied when a new slice is encountered. Whenever there is an inter-coded block, the associated motion information is inserted to the table in a first-in-first-out (FIFO) fashion as a new HMVP candidate. Then, a constrained FIFO rule can be applied. When inserting a HMVP to the table, a redundancy check is first applied to find whether there is an identical HMVP in the table. If found, that particular HMVP is removed from the table and all the HMVP candidates afterwards are moved.

HMVP candidates can be used in the merge candidate list construction process. All HMVP candidates from the last entry to the first entry in the table are inserted after the TMVP candidate. Pruning is applied on the HMVP candidates. Once the total number of available merge candidates reaches the signaled maximally allowed merge candidates, the merge candidate list construction process is terminated.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates.

Motion vector scaling may be performed during merge and/or AMVP modes. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, its associated containing picture and reference picture may be different. Therefore, a new distance (based on POC) may be calculated. And the motion vector may be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation may also be performed during merge and/or AMVP modes. If a motion vector candidate list is not complete, artificial motion vector candidates may be generated and inserted at the end of the list until it has a predetermined number of candidates.

In merge mode of HEVC, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion may be performed during merge and/or AMVP modes of HEVC. Candidates from different blocks may happen to be the same, which may decrease the efficiency of a merge/AMVP candidate list. A pruning process may be applied to solve this problem. This process compares one candidate against the others in the current candidate list to avoid inserting identical candidates, to a certain extent. To reduce the complexity, only limited numbers of pruning processes are applied, instead of comparing each potential candidate with all the other existing candidates.

Figure 5A:
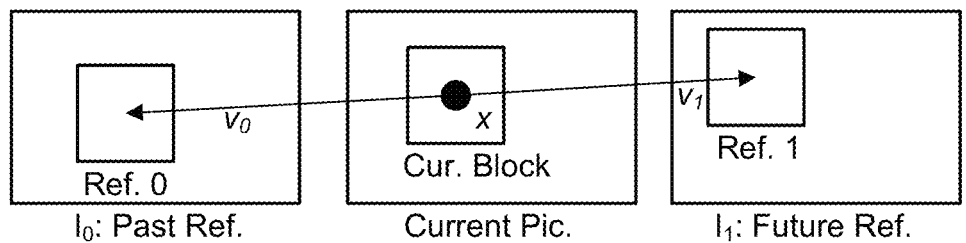
FIGS. 5A and 5B are conceptual diagrams illustrating an example of bilateral template matching.
Figure 5B:
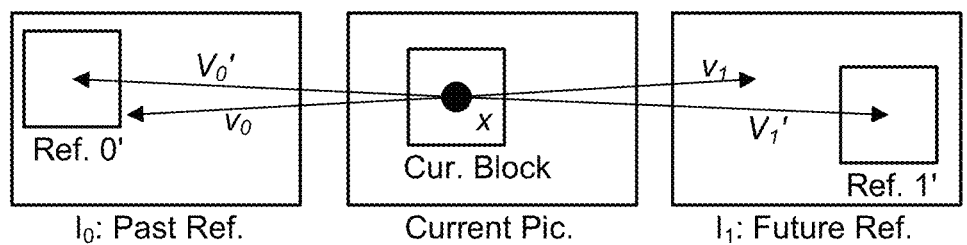

FIGS. 5A and 5B are conceptual diagrams illustrating an example of bilateral template matching. Bilateral matching is a variant of DMVR techniques that may avoid the template-based refinement process. This technique computes the bilateral matching cost directly between the uni-prediction reference blocks (denoted as $I_0(x+v_0)$ and $I_1(x+v_1)$ and x as the coordinate of a pixel within the current block) pointed to by the initial bi-prediction MVs (e.g., $v_0$ and $v_1$ in FIGS. 5A and 5B). A local search is performed based on bilateral matching within a pre-defined search range around the initial bi-prediction MVs. Specifically, supposing the initial MVs are $v_0^{(0)}$ and $v_1^{(0)}$, at the first search iteration, several MV pairs (e.g., $v_0^{(0)}+\Delta$ and $v_1^{(0)}-\Delta$ where $\Delta \in \{(0,0), (-1,1), (0,1), (1,1), (1,0), (1,-1), (0,-1), (-1,-1), (-1,0),$ and so on$\}$) and find out the optimal $\Delta^*$ which can lead to the lowest bilateral matching cost. In this contribution, the cost function is defined as the distortion between $I_0(x+v_0^{(0)}+\Delta)$ and $I_1(x+v_1^{(0)}-\Delta)$ plus motion cost. The distortion function can be either a sum of absolute difference (SAD) or Mean Removed SAD (MRSAD).

After the optimal $\Delta^*$ is found, the iteration process updates the initial MVs ($v_0^{(0)}$ and $v_1^{(0)}$ by using $\Delta^*$. Specifically, we have $v_0^{(1)}=v_0^{(0)}+\Delta^*$ and $v_1^{(1)}=v_1^{(0)}-\Delta^*$. Then, after advancing all the superscripts in the above description by 1, the same iteration process repeats until $\Delta^*$ is equal to (0,0) is reached. The output MV pair (denoted as $v_0^{(n)}$ and $v_1^{(n)}$, n≥1) may be then refined again at sub-pel precision. The resulting MV par is then taken to replace the original MVs ($v_0^{(0)}$ and $v_1^{(0)}$) of the merge block. At last, motion compensation is performed based on the refined MVs (e.g., $v_0'$ and $v_1'$ in FIG. 5B).

In JVET-K0041, a quadratic parametric function is used to form a prediction error surface for each possible fractional-pel MV. Basically, it is an interpolation function which interpolates the value of prediction errors as estimators. Based on the exact prediction error values from integer search, parameters of the quadratic parametric function are derived, and thus the best motion sampling location on this error search can be found. Then, the original MVs are adjusted to this exact motion sampling location, instead of actually performing sub-pel motion vector estimation. This parametric function takes the cost values from 5 points as reference to form an error surface and find the best position with the lowest cost value on this surface. The 5 points form a cross shape and the gap between each two adjacent points is of 2 pixels, where center/left/right/top/bottom point is coordinated at (0,0)/(−1,0)/(1,0)/(0,−1)/(0,1).

In some examples, this parametric error surface function is a 2-D parabolic error surface equation:

$$E_{x,y}=A(x-\Delta x)^2+B(y-\Delta y)^2+C,$$

where ($\Delta x$, $\Delta y$) corresponds to the position with the least cost and C corresponds to the minimum cost value.

By solving the 5 equations in 5 unknowns, ($\Delta x$, $\Delta y$) may be computed as:

$$\Delta x=\text{floor}((\alpha(E_{-1,0}-E_{1,0}))/(2(E_{-1,0}+E_{1,0}-2E_{0,0}))),$$

$$\Delta y=\text{floor}((\alpha(E_{0,-1}-E_{0,1}))/(2(E_{0,-1}+E_{0,1}-2E_{0,0}))),$$

where $\alpha$ is an integer scaling factor introduced to represent ($\Delta x$, $\Delta y$) in a certain sub-pel precision, e.g., 16 for $1/16^{th}$ precision and 4 for $1/4^{th}$ precision.

Although DMVD is efficient in reducing motion overhead, existing DMVD design (such as DMVR) may encounter a decoding latency issue due to the interdependency between the coding of spatial neighboring CUs. If the MVs of a CU are predicted from its spatial neighbors coded by using DMVR, its decoding process has to wait until the refined MVs of the neighboring CU become available. In the development of a new coding standard, Versatile Video Coding, there are several techniques of this disclosure to achieve a low-latency design for some decoder-side MV derivation (DMVD) approaches.

The techniques of this disclosure may be used to improve performance of DMVR and DMVD. For example, a size restriction may be imposed on blocks to which DMVR is applied. In particular, DMVR may be restricted to blocks having sizes larger than 8×8 pixels. That is, if one dimension of a block (width or height of the block) is equal to 8 pixels, the orthogonal dimension should be larger than 8 pixels in order to perform DMVR on the block. By restricting DMVR in this way, the block coding process may be improved without negatively impacting distortion.

Figure 6:
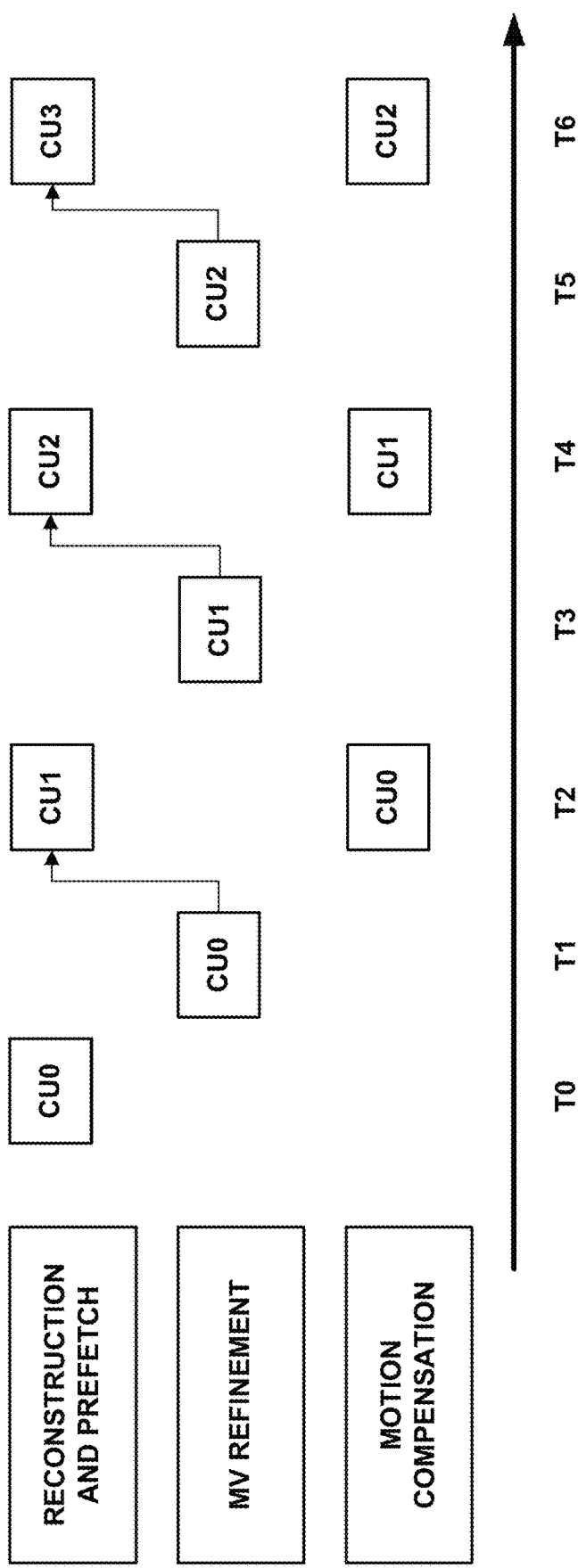
FIG. 6 is a conceptual diagram illustrating an example pipeline of stages for decoder-side motion vector derivation (DMVD).

FIG. 6 is a conceptual diagram illustrating an example pipeline of stages for decoder-side motion vector derivation (DMVD). For a block coded using DMVD, the decoding process can be interpreted in three steps: (1) reconstruction of initial motion field and prefetching reference blocks; (2) refinement process for block motions to get final MVs; and (3) motion compensation with final MVs.

After the refinement process in Step 2, final MVs are written back to picture motion field, so the refined MVs can be used as for spatial MV prediction, temporal MV prediction and boundary strength calculation. FIG. 6 demonstrates a certain implementation of pipeline stages for DMVD methods such as Decoder-side MV Refinement (DMVR). In FIG. 6, three major modules represent the three decoding steps for DMVD methods.

First, $CU_{prev}$ is a previously coded CU before the current one ($CU_{cur}$). When reconstructing the original MVs of $CU_{cur}$, if a MV predictor is from $CU_{prev}$ which happens to be a DMVD-coded block, this predictor is marked as unavailable for the $CU_{cur}$. Consequently, the reconstruction of initial MVs of $CU_{cur}$ no longer depends on the refined MVs of $CU_{prev}$ and the interdependency between MV refinement and MV prediction is removed to some extent.

Instead of using the refined MVs, in some examples, the original MVs of each DMVR CU may be used to derive the spatial MV predictors. For temporal MV prediction, refined MVs can be used without the decoding-latency issue, because the collocated picture has been fully reconstructed. Accordingly, the decoding-latency issue of DMVR can be fully solved as the coding dependency between spatial neighboring CUs no longer exists. However, a decline of coding performance can be expected.

In some examples, unrefined MVs may be used as reference from immediately neighboring blocks to perform spatial MV prediction, if these neighboring blocks together with the current one all fall in the same CTU row. (It is noted that some other technique may mark the MV predictors from such neighboring blocks as unavailable.) On the contrary, refined MVs may only be available for spatial MV prediction when their associated blocks fall within a neighboring causal CTU located at the immediately above CTU and above-left CTU. Accordingly, some examples break the inter-dependency between MV refinement and spatial MV prediction inside a CTU row.

Figure 7:
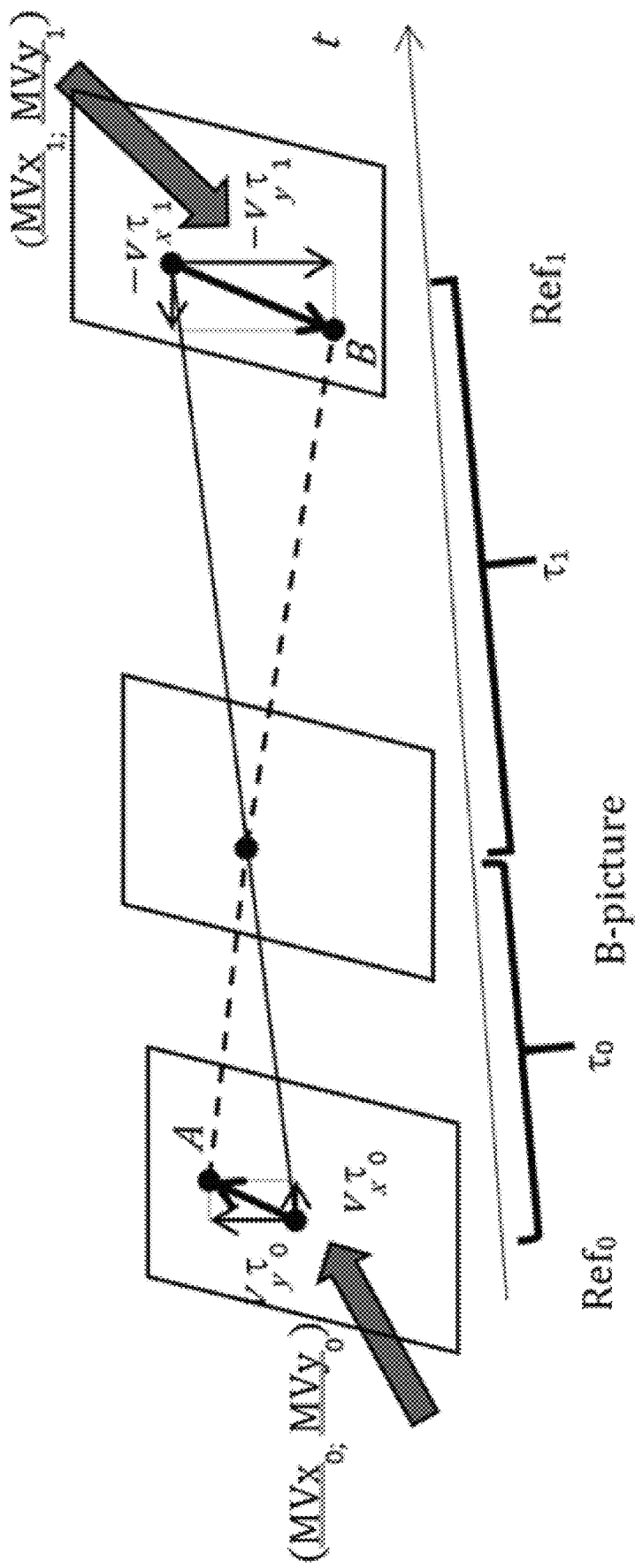
FIG. 7 is a conceptual diagram illustrating an example optical flow trajectory for bi-directional optical flow (BIO).

FIG. 7 is a conceptual diagram illustrating an example optical flow trajectory for bi-directional optical flow (BIO). BIO is pixel-wise motion refinement that is performed on top of block-wise motion compensation in a case of bi-prediction. Since BIO compensates the fine motion inside the block, enabling BIO may result in enlarging block size for motion compensation. Sample-level motion refinement does not require exhaustive search or signaling since there is an explicit equation, which gives fine motion vectors for each sample.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (1)$$

Combining optical flow equation with Hermite interpolation for motion trajectory of each sample, one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Here $\tau_0$ and $\tau_1$ denote the distance to reference frames as shown in FIG. 7. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case, BIO is applied only if prediction come not from the same time moment ($\tau_0 \ne \tau_1$), both referenced regions have non-zero motion ($MVx_0, MVy_0, MVx_1, MVy_1 \ne 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference Δ between values in points A and B (intersection of motion trajectory and reference frame planes in FIG. 7). The example model uses only first linear term of local Taylor expansion for Δ:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in (1) depend on sample location (i', j'), which was omitted so far. Assuming the motion is consistent in local surrounding, we minimize Δ inside (2M+1)×(2M+1) square window Ω centered in currently predicted point (i,j):

$$(v_x, v_y) = \underset{v_x, v_y}{\operatorname{argmin}} \sum_{[i',j'] \in \Omega} \Delta^2 [i', j'] \quad (4)$$

For this optimization problem we use a simplified solution making first minimization in vertical and then in horizontal directions. It results in $$v_x = (s_1 + r) > m\,?\,\text{clip3}\left(-thBIO, thBIO, -\frac{s_3}{(s_1+r)}\right):0 \quad (5)$$

$$v_y = (s_5 + r) > m\,?\,\text{clip3}\left(-thBIO, thBIO, -\frac{s_6 - v_x s_2/2}{(s_5+r)}\right):0 \quad (6)$$

where, $$s_1 = \sum_{[i',j'] \in \Omega} (\tau_1 \partial I^{(1)}/\partial x + \tau_0 \partial I^{(0)}/\partial x)^2; \quad (7)$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in equations (2), (3).

$$r = 500 \cdot 4^{d-8} \quad (8)$$

$$m = 700 \cdot 4^{d-8} \quad (9)$$

Here d is internal bit-depth of the input video.

In some cases, MV regiment of BIO might be unreliable due to noise or irregular motion. Therefore, in BIO, the magnitude of the MV regiment is clipped to the certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$, otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional positionfracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity.

Figure 8:
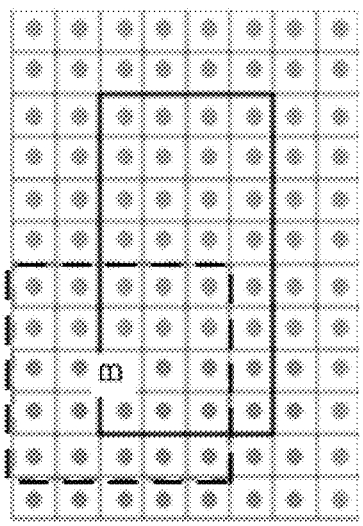
FIG. 8 is a conceptual diagram illustrating an example of gradient calculation during BIO for an 8×4 block.
Figure 8:
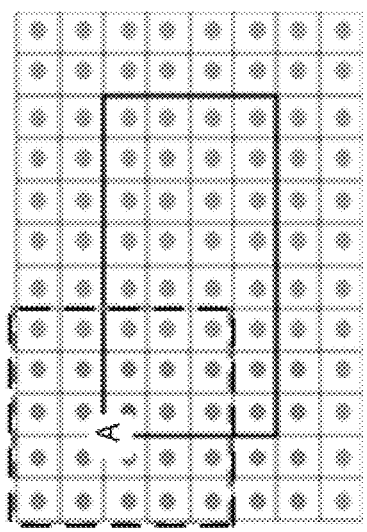
Figure 8:
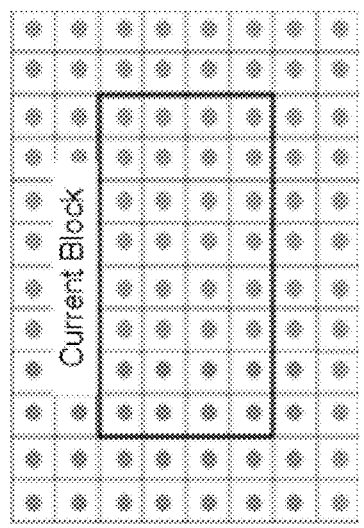

FIG. 8 is a conceptual diagram illustrating an example of gradient calculation during BIO for an 8×4 block. For an 8×4 block, a video coder may fetch motion compensated predictors and calculate the horizontal and vertical gradients of all the pixels within the block, as well as the outer two lines of pixels, because solving vx and vy for each pixel needs the horizontal and vertical gradient values and motion compensated predictors of the pixels within the window Ω centered in each pixel as, shown in equation (4). And in JEM, the size of this window is set to 5×5. Therefore, the video coder needs to fetch the motion compensated predictors and calculate the gradients for the outer two lines of pixels. In JEM, BIO is applied to all bi-directional predicted blocks when the two predictions are from different reference pictures. When LIC is enabled for a CU, BIO is disabled.

Generalized bi-prediction (GBi) was proposed in JVET-00047. JVET-K0248 improved the gain-complexity trade-off for GBi and was adopted into BMS2.1. The BMS2.1 GBi applies unequal weights to predictors from L0 and L1 in bi-prediction mode. In inter prediction mode, multiple weight pairs including the equal weight pair (1/2, 1/2) are evaluated based on rate-distortion optimization (RDO), and the GBi index of the selected weight pair is signaled to the decoder. In merge mode, the GBi index is inherited from a neighboring CU. In BMS2.1 GBi, the predictor generation in bi-prediction mode is shown below.

$$P_{GBi}=(w_0*P_{L0}+w_1*P_{L1}+\text{RoundingOffset}_{GBi})>>\text{shiftNum}_{GBi}, \qquad (10)$$

where $P_{GBi}$ is the final predictor of GBi. $w_0$ and $w_1$ are the selected GBi weight pair and applied to the predictors of list 0 (L0) and list 1 (L1), respectively. RoundingOffset$_{GBi}$ and shiftNum$_{GBi}$ are used to normalize the final predictor in GBi. The supported w1 weight set is $\{-1/4, 3/8, 1/2, 5/8, 5/4\}$, in which the five weights correspond to one equal weight pair and four unequal weight pairs. The blending gain, i.e., sum of $w_1$ and $w_0$, is fixed to 1.0. Therefore, the corresponding w0 weight set is $\{5/4, 5/8, 1/2, 3/8, -1/4\}$. The weight pair selection is at CU-level.

For non-low delay pictures, the weight set size is reduced from five to three, where the $w_1$ weight set is $\{3/8, 1/2, 5/8\}$ and the $w_0$ weight set is $\{5/8, 1/2, 3/8\}$. The weight set size reduction for non-low delay pictures is applied to the BMS2.1 GBi and all the GBi tests in this contribution.

This disclosure recognizes that DMVD-related methods (PMMVD, Bilateral Template Matching, Decoder-side MV Refinement and so on) provide significant coding performance improvements. Some of these existing technologies have further solved the inter-dependency issue (also known as a decoding latency issue) partially or completely (at the cost of coding efficiency) between decoder-side MV derivation process and spatial MV prediction. Also, the same decoding latency issue also occurs in many application scenarios when DMVR is involved in BIO, history-based merge candidates, and affine merge candidates. However, certain use cases should be specified regarding 1) how refined MVs can be used and 2) how refined MVs can be replaced when they are inaccessible. Moreover, the current design of GBi, Weighted-bi prediction, MMVR, Merge Offset Extension, and DMVR padding processes can be improved to make the most of DMVR to reduce memory buffer size and computational complexity. The techniques of this disclosure may address these and other concerns, thereby improving the technical field of video coding (encoding and/or decoding), as well as improving devices that perform video coding, such as video encoders and video decoders.

Figure 9:
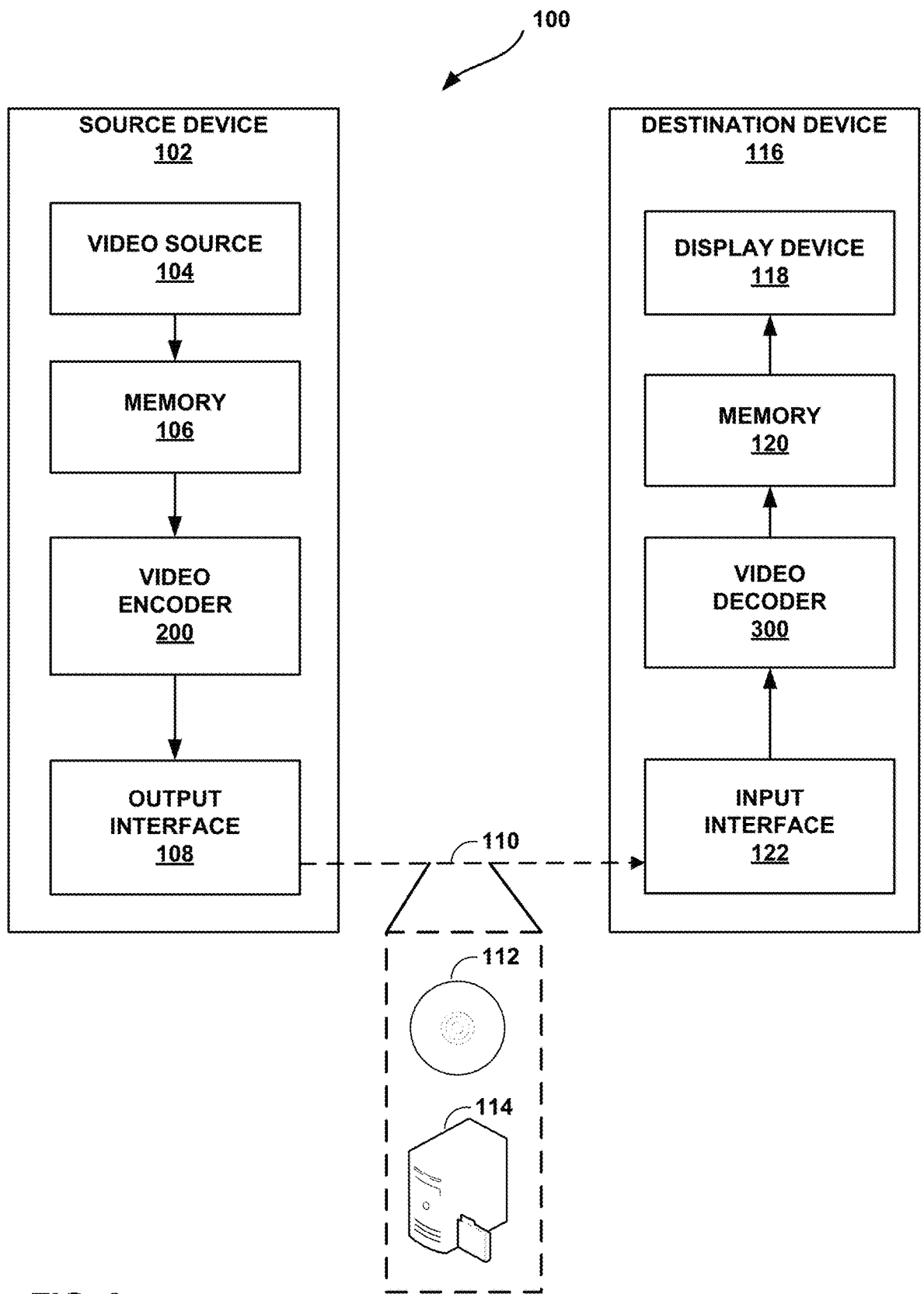
FIG. 9 is a block diagram illustrating an example video encoding and decoding system that may perform the techniques of this disclosure.

FIG. 9 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 9, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 9, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for improving DMVR. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 9 is merely one example. In general, any digital video encoding and/or decoding device may perform techniques for improving DMVR. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memories 106, 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 9, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (WET) of ITU-T SG 16 WP 3 and ISO/IEC JTC 1/SC 29/WG 11, 15th Meeting: Gothenburg, SE, 3-12 Jul. 2019, JVET-02001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quad-tree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quad-tree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quad-tree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Video encoder 200 and video decoder 300 may perform the techniques of this disclosure to enhance decoder-side motion vector refinement (DMVR). Although referred to as "decoder-side," it should be understood that video encoder 200 may also perform these techniques, to ensure that corresponding prediction blocks generated by both video encoder 200 and video decoder 300 are consistent. Video encoder 200 and video decoder 300 may perform any or all of the techniques discussed below, alone or in any combination.

Figure 10B:
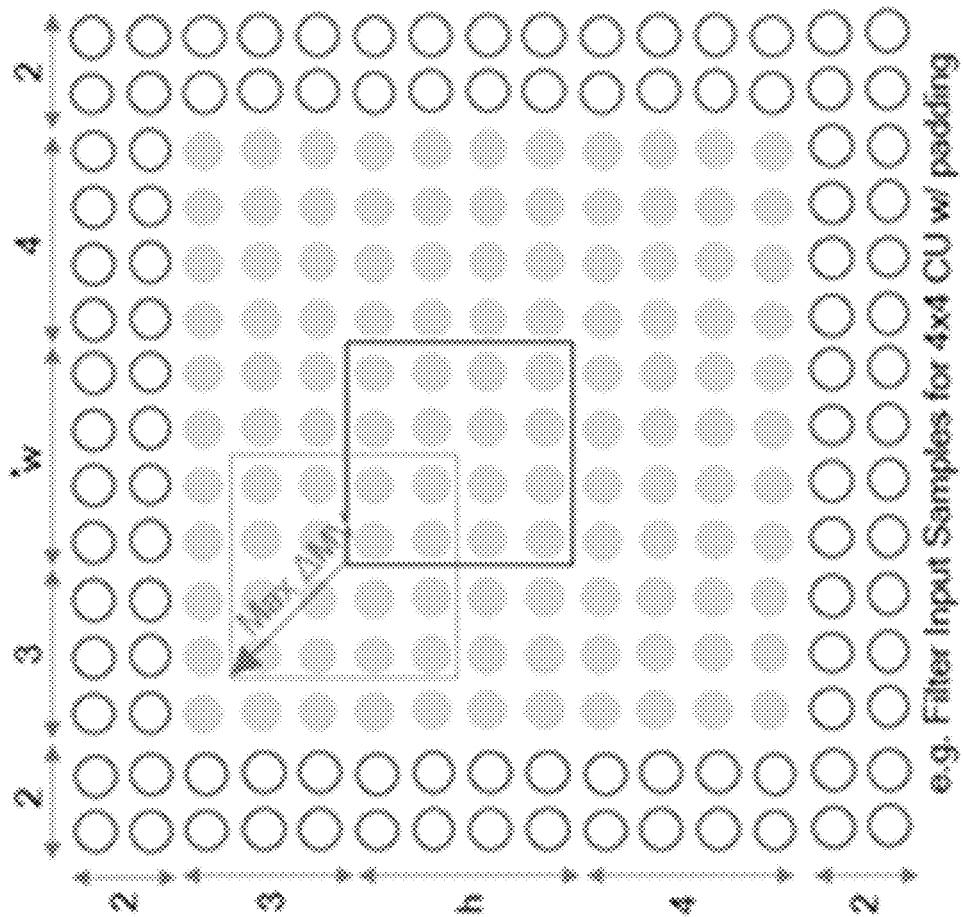
FIGS. 10A and 10B are conceptual diagrams illustrating an example technique for reducing memory bandwidth associated with performing BIO using refined motion vectors.
Figure 10A:
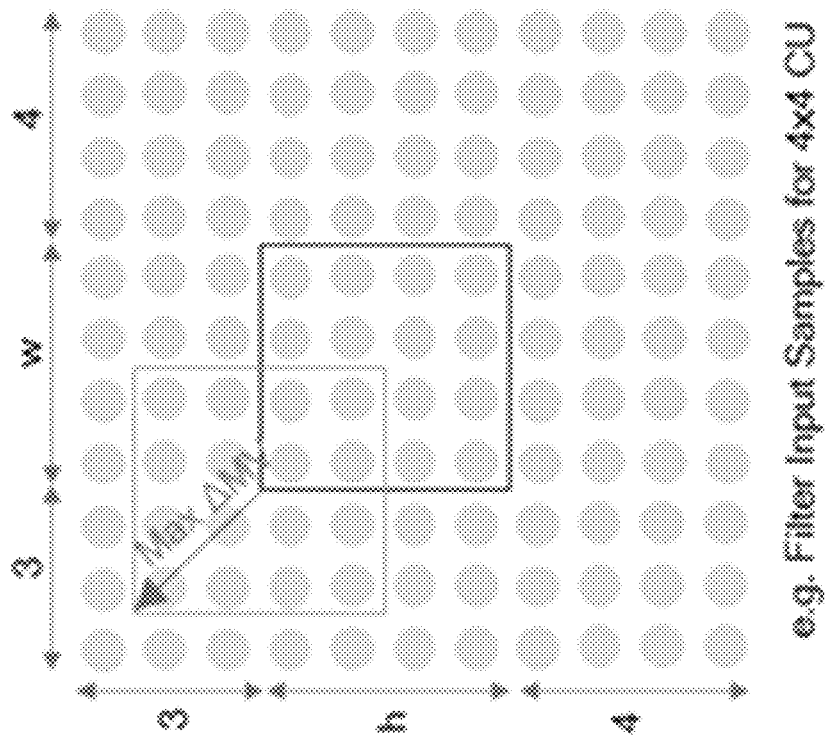

FIGS. 10A and 10B are conceptual diagrams illustrating an example technique for reducing memory bandwidth associated with performing BIO using refined motion vectors. Video encoder 200 and video decoder 300 may be configured to use this technique to allow BIO to take the padded filter input samples (i.e., samples fetched from reference picture and used for motion compensation) as a source for computing gradient values and to perform final motion compensation.

Due to a constraint on memory bandwidth, the maximum number of pixels that can be fetched from a reference picture is (w+7)*(h+7), where w and h denotes the width and height of a CU. With a pre-defined maximum displacement vector, d, that can be derived from decoder-side motion vector refinement (DMVR) and/or template matching prediction (TMP), the fetched sample area should be as large as (w+7+2d)*(h+7+2d) where the additional samples outside the (w+7)*(h+7) area are padded from nearby samples and d≥0.

FIG. 10B illustrates the geometric relationship between the (w+7)*(h+7) area and padded samples. When BIO is applied with refined MVs (e.g., the ΔMV in FIGS. 10A and 10B), it still needs extra pixels outside the padded area to compute gradient values. Accordingly, video encoder 200 and video decoder 300 may enlarge the padded size from d pixels to d+s pixels, where s is the half of the length of gradient filter (e.g., s=1,2,3, . . . for 3,5,7, . . . -tap gradient filters, respectively). The same padding method used to form (w+7+2d)*(h+7+2d) is applied. The resulting size of original filter input samples plus padded area becomes (w+7+2d+2s)*(h+7+2d+2s).

Figure 11:
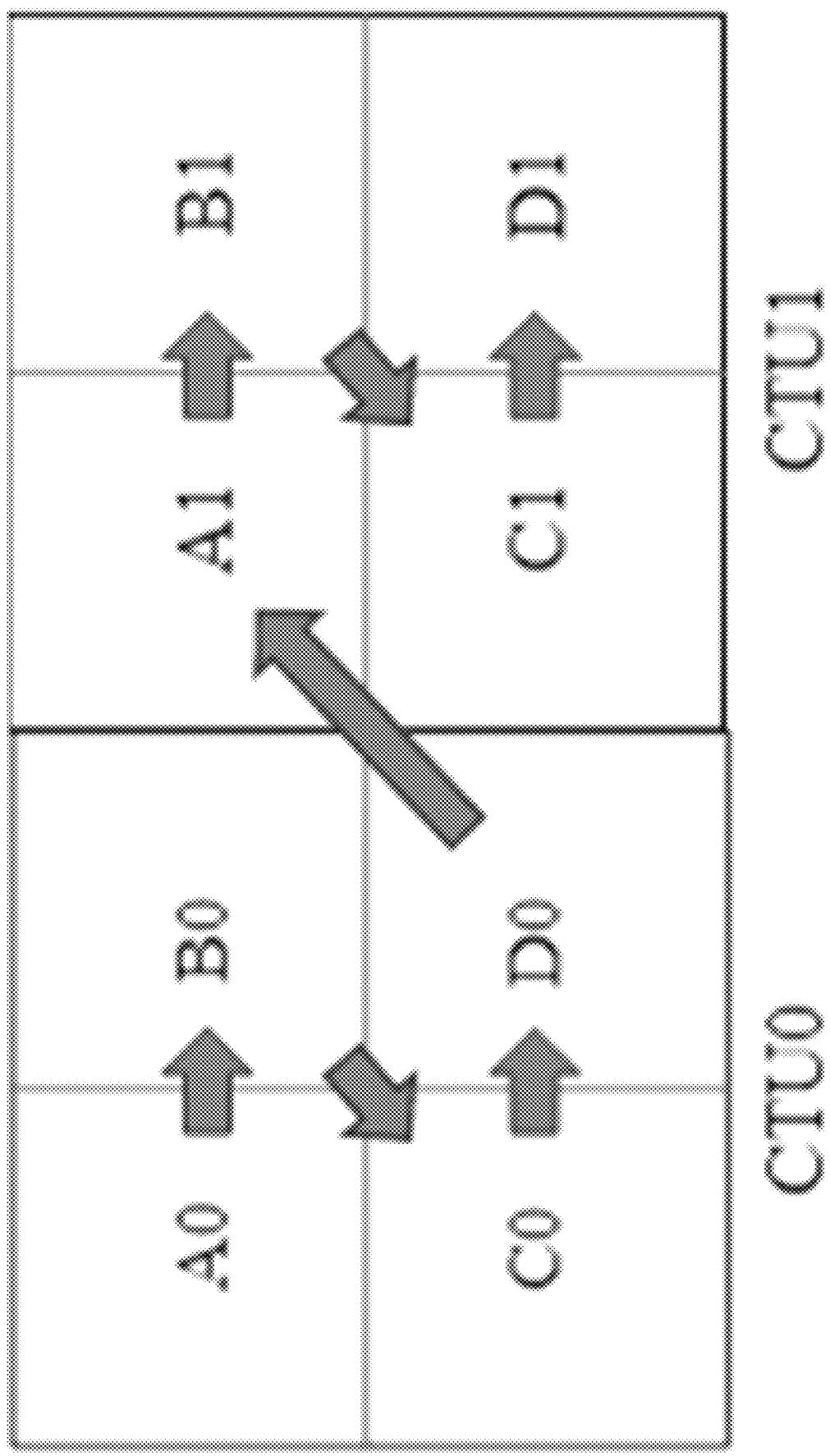
FIG. 11 is a conceptual diagram illustrating an example processing order of virtual pipeline data units (VPDUs) across coding tree units (CTUs).

FIG. 11 is a conceptual diagram illustrating an example processing order of virtual pipeline data units (VPDUs) across coding tree units (CTUs). Video encoder 200 and video decoder 300 may restrict where references for motion vector prediction can be taken for merge mode and/or AMVP mode. Due to the pre-fetching issue (as described above), not every refined MV from decoded CUs in the current frame is available for subsequent blocks to perform spatial motion prediction. Basically, refined MVs in a spatial causal neighborhood can be used if and only if the refined motion vectors are from a block in either an above-left CTU or an above CTU. Either or both of the following two techniques may be used alone or in combination with each other and/or with other techniques described herein.

In one example, refined MVs from above-right CTU can also be taken as reference for spatial motion prediction. In another example, refined MVs generated at least N VPDU (Virtual Pipeline Data Unit with size of 64×64, N>1) ahead can be taken as reference for spatial motion prediction. As shown in FIG. 11, when the CTU size is of 128×128, the pipeline data unit splits a CTU down to 4 equal-sized, non-overlapping square blocks in order to fit for the maximum size of transform unit no matter what the underlying CU partition is. Thus, some of the refined MVs in the immediately spatial neighboring VPDU may become available. For example, given that N=2, D0/A1/D1 can take refined MVs from A0/B0/A1 and C1 can take reference from B0 and D0.

In some examples, there may be additional constraints on the updating process of an HMVP list, as follows. When an affine flag is off (i.e., translational motion model), refined MVs of a decoded CU in the current frame cannot be pushed into the HMVP list. Instead, two alternatives may be used to update the HMVP list. In some examples, original MVs of the decoded CU are pushed into the HMVP list. In other examples, nothing is pushed to update the HMVP list.

In some examples, when affine flag is on (i.e., affine motion model), refined CPMVs (control-point motion vectors) of a decoded CU in the current frame cannot be pushed into the affine HMVP list. Instead, video encoder 200 and video decoder 300 may update the affine HMVP list by pushing original CPMVs of this decoded CU into the affine HMVP list. Alternatively, in some examples, nothing is pushed to update the affine HMVP list.

Another example techniques includes a constraint on a constructed affine merge candidate (also called constructed mode) to avoid taking refined MVs conditionally from causal neighboring sub-blocks as CPMVs to form an affine merge candidate. In this example technique, each sub-block MV that is sampled in the spatial causal neighborhood of the current CU applies the following rules to determine whether its original sub-block MV or its refined alternative can be used for the constructed mode. (It is noted that the MVs here can be of translational motion, affine CPMVs and affine-derived sub-block MVs.) In some examples, if the sampled sub-blocks are located in above CTU row, their refined MVs (if they exist) can be used for the constructed mode. Additionally or alternatively, if the sampled sub-blocks are located in the current CTU or others to the left of the current one, only their original MVs (if they exist) can be used for the constructed mode.

In addition, for a low-complexity code design, sub-blocks with refined information in the current CTU row are always marked as unavailable in the process of the constructed mode, and those sitting at the CTU row immediately above the current CTU row are marked as available. Moreover, video encoder 200 and video decoder 300 may reserve the additional flexibility to determine (e.g., pre-defined or configured at sequence level) whether refined MVs from above-right CTUs should be marked as available or not in the process of the constructed mode.

In some examples, video encoder 200 and video decoder 300 may normalize weight values that are applied to bi-prediction using generalized bi-prediction (GBi) and weighted bi-prediction (WP). According to the magnitude of a weight value, each prediction samples may have unequal contribution to the final prediction signal of bi-prediction. However, DMVR always assumes the L0 and L1 prediction signals contributes equally to the final bi-prediction signal, so the objective function is defined as finding delta MVs to minimize the difference between L0 and L1 prediction blocks. As this assumption may not hold when unequal weight values are used for bi-prediction, this example technique includes normalizing the weight values that are used by GBi and WP. Supposing $w_0$ and $w_1$ are weight values applied respectively to L0 and L1 prediction blocks (i.e., denoted respectively as $p_0$ and $p_1$), the proposed normalized cost function is defined as follows:

$$\text{Cost function}=w_1*p_0[n]-w_0*p_1[n]$$

or $$\text{Cost function}=w_0*p_0[n]-w_1*p_1[n],$$

where n is the local pixel coordinate of a pixel in a prediction block.

To prevent these equations from non-integer operations, a positive integer scaler (denoted as s) may be applied to $w_0$ and $w_1$.

$$\text{Cost function}=(w_1*s)*p_0[n]-(w_0*s)*p_1[n]$$

or $$\text{Cost function}=(w_0*s)*p_0[n]-(w_1*s)*p_1[n],$$

The value of s can be 1, 2, 4, 8 and other power-of-2 integers. For example, the suggested configuration of s can be: s=8 for GBi; $s=2^{luma\_log2\_weight\_denom+Max(2, 14-LumaBitDepth)}$ for luma WP; or $s=2^{luma\_log2\_weight\_denom-delta\_chroma\_log2\_weight\_denom+Max(2, 14-ChromaBitDepth)}$ for chroma WP.

In various examples, constraints may be imposed on DMVR to limit its use when the syntax of either MMVR or Merge Offset Extension is present in the bitstream. Five example, independent constraints are shown below:

DMVR is always applied to blocks with bi-prediction motion no matter whether it is generated by MMVR, Merge Offset Extension, or regular merge mode.

DMVR is applied to bi-prediction motion derived from 1) regular merge mode and 2) that MMVR or Merge Offset Extension with a displacement vector pointing outside a [±d, ±d] area centered at the original-motion-pointed position, where d≥0.

DMVR is applied to bi-prediction motion derived from 1) regular merge mode and 2) that MMVR or Merge Offset Extension with a displacement vector pointing inside a [±d, ±d] area centered at the original-motion-pointed position, where d≥0.

DMVR is only applied to refine bi-prediction motion when it is not generated by MMVR and Merge Offset Extension.

DMVR is not applied to merge candidates that are with the syntax of MMVR and Merge Offset extension. For example, a video standard may apply MMVR syntax to some motion candidates in a merge list. In this disclosure, DMVR is not applied to them.

Figure 12:
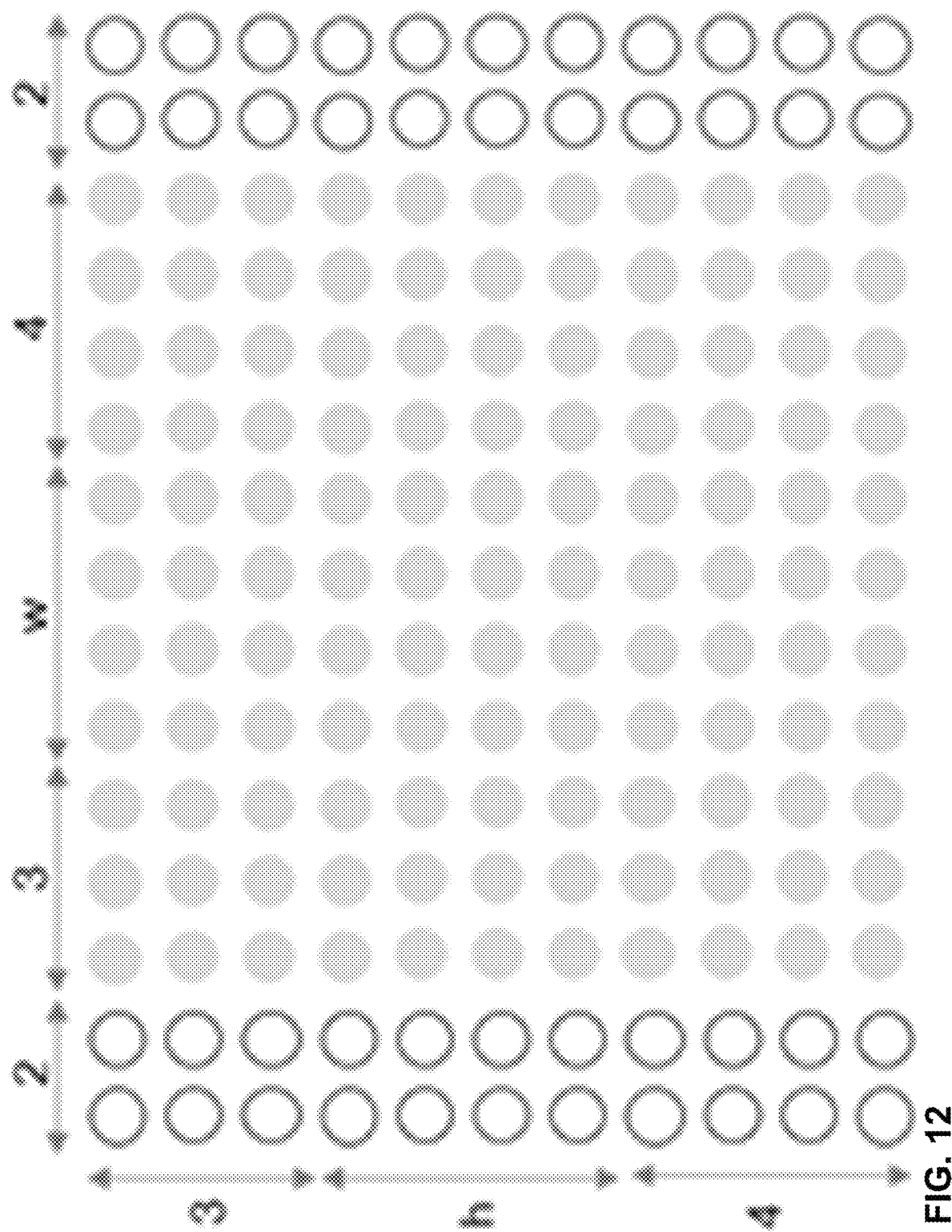
FIG. 12 is a conceptual diagram illustrating a technique in which only horizontal padding is used for horizontal interpolation.

FIG. 12 is a conceptual diagram illustrating a technique in which only horizontal padding is used for horizontal interpolation. In some examples, video encoder 200 and video decoder 300 may perform a specified ordered process to reduce the computational complexity and storage space of the padding process (aforementioned above) in DMVR. In the examples above, two extra pixels are padded to each side of the (w+7)*(h+7) pixels. Results are buffered in a memory block containing (w+11)*(h+11) pixels. Then, the DMVR requires performance of motion compensation to form search-area samples. Basically, horizontal interpolation is applied first and an intermediate buffer of size (w+11−t)*(w+11) is required to buffer the interpolation results, where t is the number of interpolation filter taps minus 1. For example, t=7 when the interpolation filter is of 8 taps.

In some examples, the padding process becomes a two-step process. First, instead of performing padding to each side of the (w+7)*(h+7) pixels, video encoder 200 and video decoder 300 may only perform the padding process horizontally. Thus, only (w+11)*(h+7) pixels need to be buffered before performing horizontal interpolation. Then, video encoder 200 and video decoder 300 may perform horizontal interpolation and buffer the resulting pixels to fit in a memory block of size (w+11−t)*(h+7). Following this, video encoder 200 and video decoder 300 may perform vertical padding to the top and bottom of the memory block to form the same pixels as the aforementioned (w+11−t)*(w+11) pixels that are generated through the original padding process.

With the 2-step padding process, the buffer size for keeping horizontal interpolation input is effectively reduced from (w+11)*(h+11) to (w+11)*(h+7). Accordingly, the computational complexity introduced from horizontal interpolation can be reduced.

In some examples, video encoder 200 and video decoder 300 may perform one or more of the three example techniques below to extend the notion of parametric sub-pel MV derivation to a more accurate MV representation with rounding offset and alternative sampling locations.

In some examples, video encoder 200 and video decoder 300 may perform a rounding offset. That is, video encoder 200 and video decoder 300 may add a rounding offset to the solution of parametric error surface function, as follows:

$$\Delta x=\text{floor}((2\alpha(E_{-1,0}-E_{1,0})+\beta)/(4(E_{-1,0}+E_{1,0}-2E_{0,0}))),$$

$$\Delta y=\text{floor}((2\alpha(E_{0,-1}-E_{0,1})+\beta)/(4(E_{0,-1}+E_{0,1}-2E_{0,0}))),$$

where β is the rounding offset which can be determined at sequence, picture, tile or slice level. The value of β can be 0, ±e, ±2e, ±3e, 4e−1 or −4e+1, where $e=E_{-1,0}+E_{1,0}-2E_{0,0}$.

In addition, in some examples, video encoder 200 and video decoder 300 may also use a simplified design in which the rounding offset is directly set as a constant value without signaling, e.g., $\beta=2(E_{-1,0}+E_{1,0}-2E_{0,0})$.

In some examples, video encoder 200 and video decoder 300 may perform a sparse sampling representation. Instead of sampling the cost values from the end points of a cross shape with 1-pel interval, video encoder 200 and video decoder 300 may apply techniques that extend the notion of parametric sub-pel MV derivation to N-pel interval.

$$\Delta x = \text{floor}((N\alpha(E_{-N,0}-E_{N,0})+\beta)/(2(E_{-N,0}+E_{N,0}-2E_{0,0}))),$$

$$\Delta y = \text{floor}((N\alpha(E_{0,-N}-E_{0,N})+\beta)/(2(E_{0,-N}+E_{0,N}-2E_{0,0}))),$$

where N can be 1, 2, 3, 4, . . . , 8 and indicated at sequence, picture, tile or slice level.

In addition, this disclosure also proposes a simplified design with a constant value, that is, N=2.

These techniques also work with the rounding offset as mentioned above. When rounding offset is present, ($\Delta x$, $\Delta y$) can be represented as:

$$\Delta x = \text{floor}((2N\alpha(E_{-N,0}-E_{N,0})+\beta)/(4(E_{-N,0}+E_{N,0}-2E_{0,0}))),$$

$$\Delta y = \text{floor}((2N\alpha(E_{0,-N}-E_{0,N})+\beta)/(4(E_{0,-N}+E_{0,N}-2E_{0,0}))),$$

where $\beta$ is the rounding offset which can be determined at sequence, picture, tile or slice level. The value of $\beta$ can be 0, ±e, ±2e, ±3e, 4e−1 or −4e+1, where $e=E_{-N,0}+E_{N,0}-2E_{0,0}$. In addition, video encoder 200 and video decoder 300 may use a simplified design in which the rounding offset can be directly set as a constant value without signaling, e.g., $\beta=2(E_{-N,0}+E_{N,0}-2E_{0,0})$.

In some examples, video encoder 200 and video decoder 300 may perform an alternative sampling pattern. In some examples, the sampling locations used for parametric sub-pel MV derivation need not be from the end points of a cross-shape pattern along x and y axes. In such examples, video encoder 200 and video decoder 300 may rotate the coordinating system counter-clockwise by 45 degrees, resulting in a new closed-form solution, ($\Delta x$, $\Delta y$), of the parametric solution, as follows:

$$dx = \text{floor}((\alpha(E_{-1,1}-E_{1,-1}))/(2(E_{-1,1}+E_{1,-1}-2E_{0,0}))),$$

$$dy = \text{floor}((\alpha(E_{-1,-1}-E_{1,1}))/(2(E_{-1,-1}+E_{1,1}-2E_{0,0}))),$$

and $$(\Delta x, \Delta y) = (dx, dy) + (dy, -dx)$$

Besides, these techniques can also work with the rounding offset discussed above and/or sparse sampling discussed above.

Rounding Offset:

$$dx = \text{floor}((\alpha(E_{-1,1}-E_{1,-1})+\beta)/(4(E_{-1,1}+E_{1,-1}-2E_{0,0}))),$$

$$dy = \text{floor}((\alpha(E_{-1,-1}-E_{1,1})+\beta)/(4(E_{-1,-1}+E_{1,1}-2E_{0,0}))),$$

Sparse Sampling:

$$dx = \text{floor}((N\alpha(E_{-N,N}-E_{N,-N}))/(2(E_{-N,N}+E_{N,-N}-2E_{0,0}))),$$

$$dy = \text{floor}((N\alpha(E_{-N,-N}-E_{N,N}))/(2(E_{-N,-N}+E_{N,N}-2E_{0,0}))),$$

Combination:

$$dx = \text{floor}((2N\alpha(E_{-N,N}-E_{N,-N})+\beta)/(4(E_{-N,N}+E_{N,-N}-2E_{0,0}))),$$

$$dy = \text{floor}((2N\alpha(E_{-N,-N}-E_{N,N})+\beta)/(4(E_{-N,-N}+E_{N,N}-2E_{0,0}))),$$

In some examples, video encoder 200 and video decoder 300 may employ a constraint on the minimal block size of DMVR, in order to prevent DMVR from over-increasing the worst-case memory bandwidth of inter prediction. In such examples, when a prediction block satisfies any of the below conditions, video encoder 200 and video decoder 300 do not perform DMVR.

The block size is of N×4 or 4×N, where N is a positive integer (e.g., 4, 8, 16, 32, 64, 128, 256, . . . ).

The block size is the same as 8×8.

In some examples, video encoder 200 and video decoder 300 may avoid performing DMVR for blocks of the following sizes:

The block size is of N×4 or 4×N with N<64 (e.g., 4, 8, 16, 32).

The block size is of N×4 or 4×N with N≥64 (e.g., 64, 128), when the search points of DMVR is not fully covered within a [−1,1]×[−1,1] range.

The block size is the same as 8×8.

In this manner, video encoder 200 and video decoder 300 may avoid performing DMVR for a block having at least one of a width or a height of less than 8 pixels, or a size equal to 8×8 pixels. Video encoder 200 and video decoder 300 may perform DMVR for blocks having sizes greater than 8×8, that is, at least 8×N or N×8 where N is an integer value greater than 8. DMVR may be enabled for such blocks by default, or video encoder 200 and video decoder 300 may be configured with additional criteria to be evaluated in order to determine whether to perform DMVR for such blocks.

This disclosure may generally refer to "signaling" certain information, such as syntax elements. The term "signaling" may generally refer to the communication of values of syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 13A:
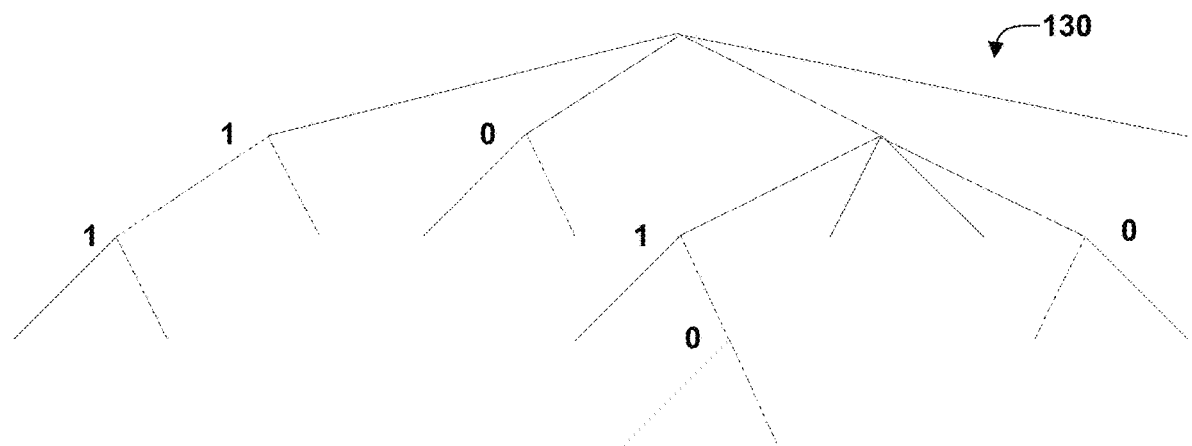
FIGS. 13A and 13B are conceptual diagrams illustrating an example quad-tree binary tree (QTBT) structure, and a corresponding coding tree unit (CTU).
Figure 13B:
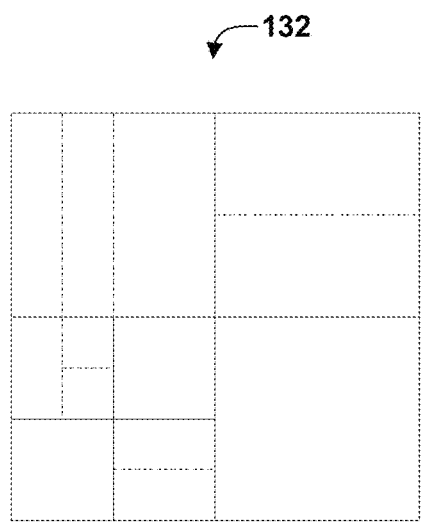

FIGS. 13A and 13B are conceptual diagrams illustrating an example quad-tree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 13B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 14:
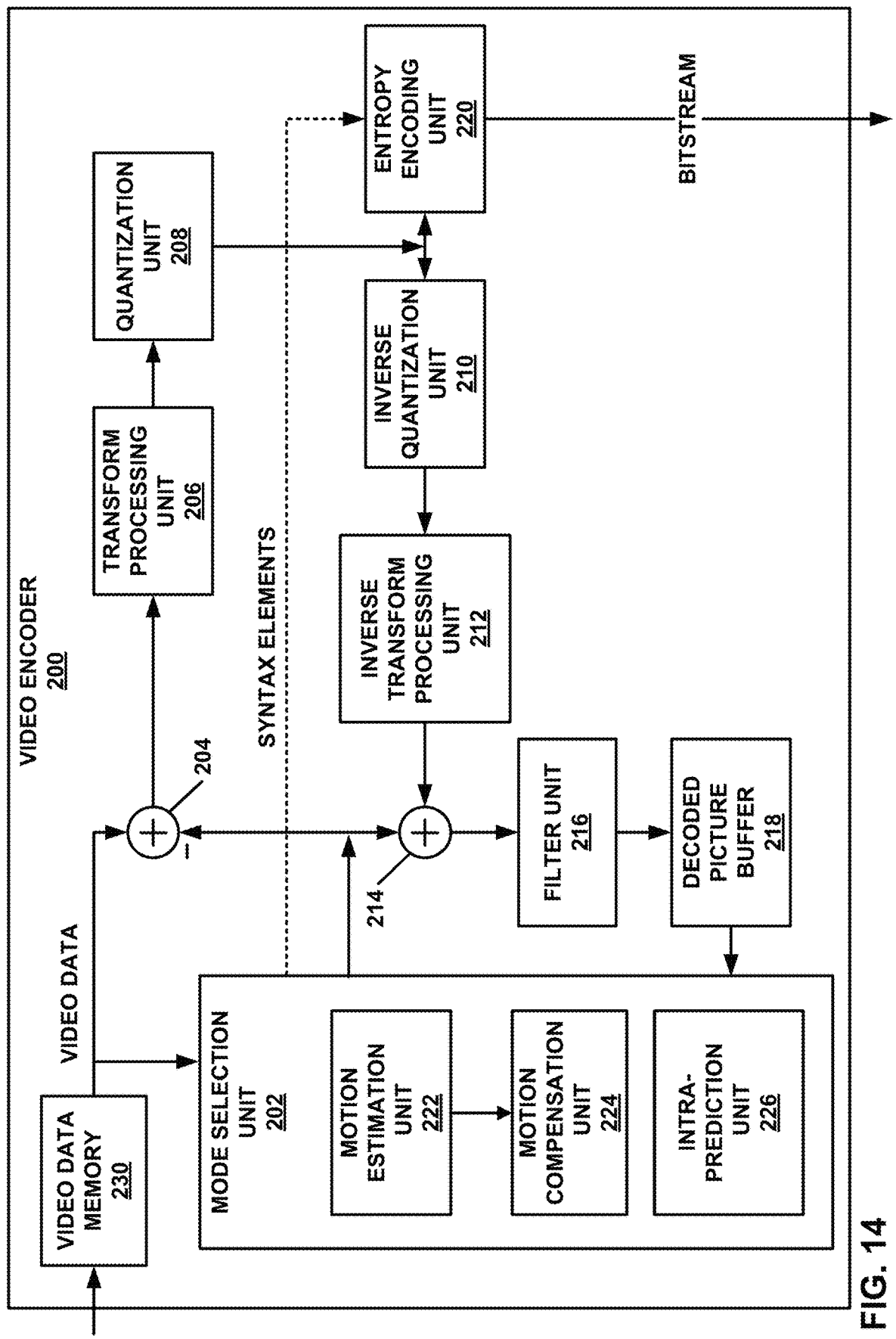
FIG. 14 is a block diagram illustrating an example video encoder that may perform the techniques of this disclosure.

FIG. 14 is a block diagram illustrating an example video encoder 200 that may perform the techniques of this disclosure. FIG. 14 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 14, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 9). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 9 may also provide temporary storage of outputs from the various units of video encoder 200.

The various units of FIG. 14 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 9) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, motion compensation unit 224 may perform DMVR to refine a motion vector when DMVR is enabled for a current block of video data. For example, if the current block has a size less than or equal to 8×8, i.e., a width or a height less than 8 pixels or a size exactly equal to 8×8 pixels, motion compensation unit 224 may avoid performing DMVR on the motion vector, and use the motion vector to generate the prediction block. Otherwise, if the block has a size greater than 8×8 (e.g., a size of at least 8×N or N×8 where N is an integer greater than 8), motion compensation unit 224 may determine whether to perform DMVR on the motion vector using other criteria. When DMVR is enabled, motion compensation unit 224 may perform DMVR as discussed above, and then generate a prediction block using the refined motion vector.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 represents an example of a device for coding (encoding and decoding, in this example) video data, the device including a memory configured to store video data; and one or more processors implemented in circuitry and configured to: determine that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determine that the block is not coded using decoder-side motion vector refinement (DMVR); and in response to determining that the block is not coded using DMVR, code the block without performing DMVR for the block.

Figure 15:
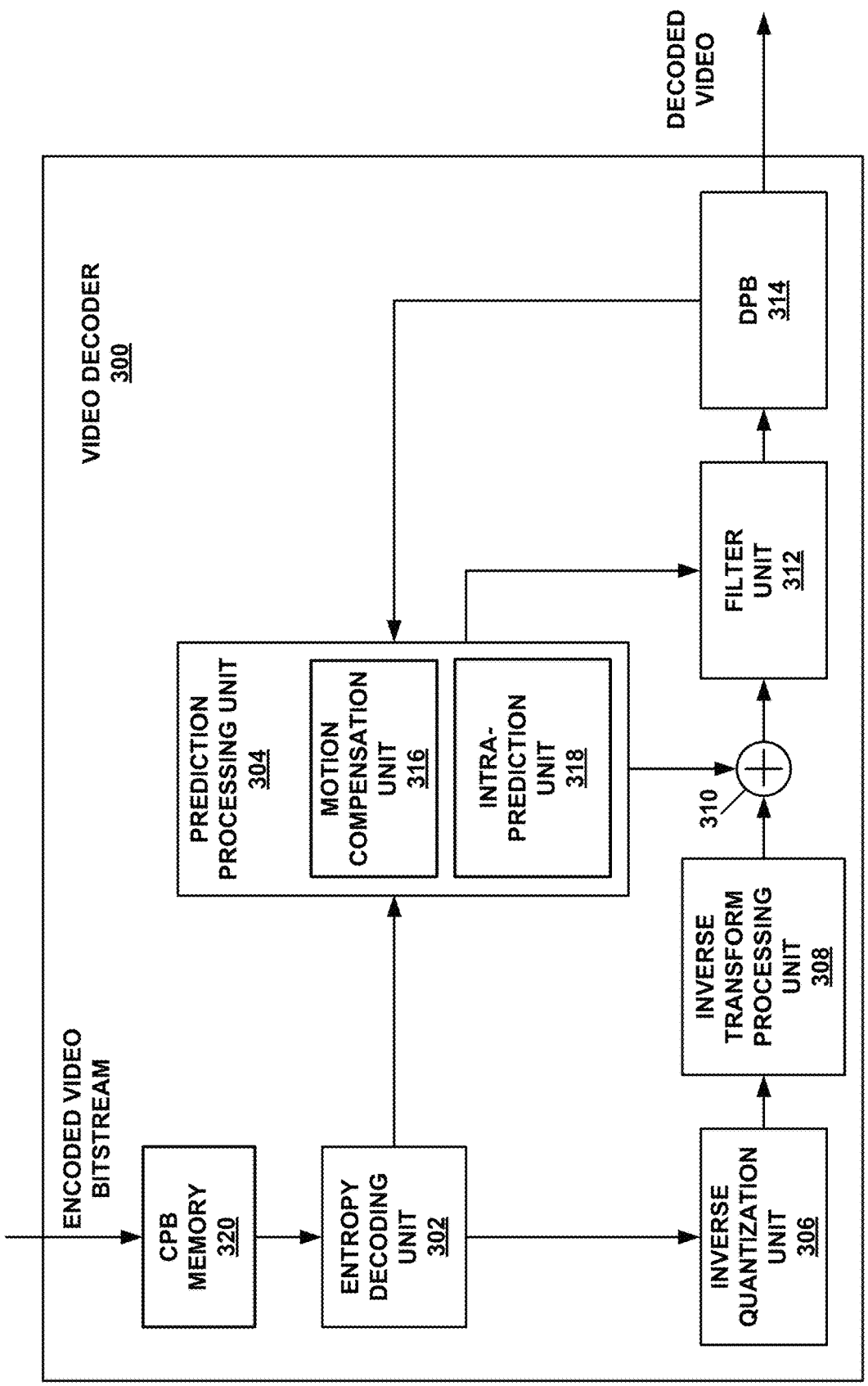
FIG. 15 is a block diagram illustrating an example video decoder that may perform the techniques of this disclosure.

FIG. 15 is a block diagram illustrating an example video decoder 300 that may perform the techniques of this disclosure. FIG. 15 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 15, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 9). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 9). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 15 are illustrated to assist with understanding the operations performed by video decoder 300. The units may be implemented as fixed-function circuits, programmable circuits, or a combination thereof. Similar to FIG. 14, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 14).

In accordance with the techniques of this disclosure, motion compensation unit 316 may perform DMVR to refine a motion vector when DMVR is enabled for a current block of video data. For example, if the current block has a size less than or equal to 8×8, i.e., a width or a height less than 8 pixels or a size exactly equal to 8×8 pixels, motion compensation unit 316 may avoid performing DMVR on the motion vector, and use the motion vector to generate the prediction block. Otherwise, if the block has a size greater than 8×8 (e.g., a size of at least 8×N or N×8 where N is an integer greater than 8), motion compensation unit 316 may determine whether to perform DMVR on the motion vector using other criteria. When DMVR is enabled, motion compensation unit 316 may perform DMVR as discussed above, and then generate a prediction block using the refined motion vector.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 14). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device for coding (decoding, in this example) video data, the device including a memory configured to store video data; and one or more processors implemented in circuitry and configured to: determine that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determine that the block is not coded using decoder-side motion vector refinement (DMVR); and in response to determining that the block is not coded using DMVR, code the block without performing DMVR for the block.

Figure 16:
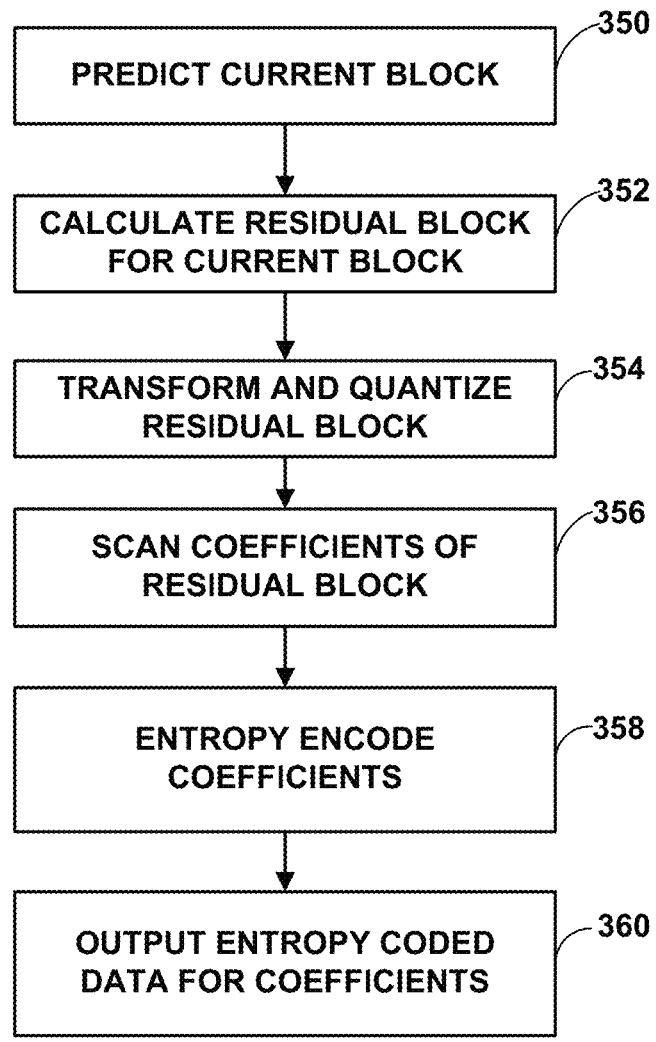
FIG. 16 is a flowchart illustrating an example method of encoding a current block in accordance with the techniques of this disclosure.

FIG. 16 is a flowchart illustrating an example method of encoding a current block in accordance with the techniques of this disclosure. The current block may comprise a current CU. Although described with respect to video encoder 200 (FIGS. 9 and 14), it should be understood that other devices may be configured to perform a method similar to that of FIG. 16.

In this example, video encoder 200 initially predicts the current block (350). For example, video encoder 200 may form a prediction block for the current block. Video encoder 200 may perform any or all of the techniques related to DMVR of this disclosure when forming the prediction block. In some examples, video encoder 200 may refine a motion vector determined from a motion search using decoder-side motion vector refinement (DMVR), as discussed above. In particular, in accordance with the techniques of this disclosure, video encoder 200 may determine whether to perform DMVR based at least in part on a size of the current block. If the current block has at least one of a width or a height less than 8 pixels, or has both a width and a height equal to 8 pixels (i.e., a size of 8×8 pixels), video encoder 200 may determine not to perform DMVR for the current block. Otherwise, if the current block has a size of at least 8×N or N×8, wherein N is an integer value greater than 8, video encoder 200 may determine to perform DMVR or determine whether to perform DMVR for the current block based on additional criteria. Video encoder 200 may then use the motion vector, potentially refined using DMVR, to form the prediction block.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data for coefficients of the block (360).

In this manner, FIG. 16 represents an example of a method of coding (namely, encoding) a block of video data including determining that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determining that the block is not coded using decoder-side motion vector refinement (DMVR); and in response to determining that the block is not coded using DMVR, coding the block without performing DMVR for the block.

Figure 17:
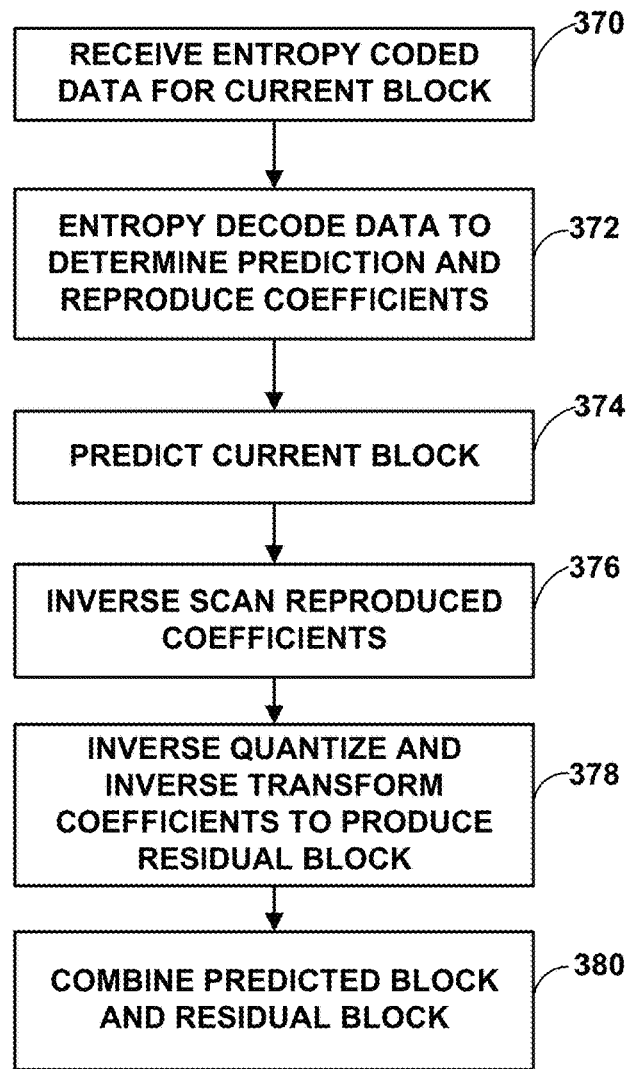
FIG. 17 is a flowchart illustrating an example method of decoding a current block in accordance with the techniques of this disclosure.

FIG. 17 is a flowchart illustrating an example method of decoding a current block in accordance with the techniques of this disclosure. The current block may comprise a current CU. Although described with respect to video decoder 300 (FIGS. 9 and 15), it should be understood that other devices may be configured to perform a method similar to that of FIG. 17.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an inter-prediction mode as indicated by the prediction information for the current block, to calculate a prediction block for the current block.

Video decoder 300 may perform any or all of the techniques related to DMVR of this disclosure when forming the prediction block. In some examples, video decoder 300 may refine a decoded motion vector determined using decoder-side motion vector refinement (DMVR), as discussed above. In particular, in accordance with the techniques of this disclosure, video decoder 300 may determine whether to perform DMVR based at least in part on a size of the current block. If the current block has at least one of a width or a height less than 8 pixels, or has both a width and a height equal to 8 pixels (i.e., a size of 8×8 pixels), video decoder 300 may determine not to perform DMVR for the current block. Otherwise, if the current block has a size of at least 8×N or N×8, wherein N is an integer value greater than 8, video decoder 300 may determine to perform DMVR or determine whether to perform DMVR for the current block based on additional criteria. Video decoder 300 may then use the motion vector, potentially refined using DMVR, to form the prediction block.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, FIG. 17 represents an example of a method of coding (namely, decoding) a block of video data including determining that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determining that the block is not coded using decoder-side motion vector refinement (DMVR); and in response to determining that the block is not coded using DMVR, coding the block without performing DMVR for the block.

Figure 18:
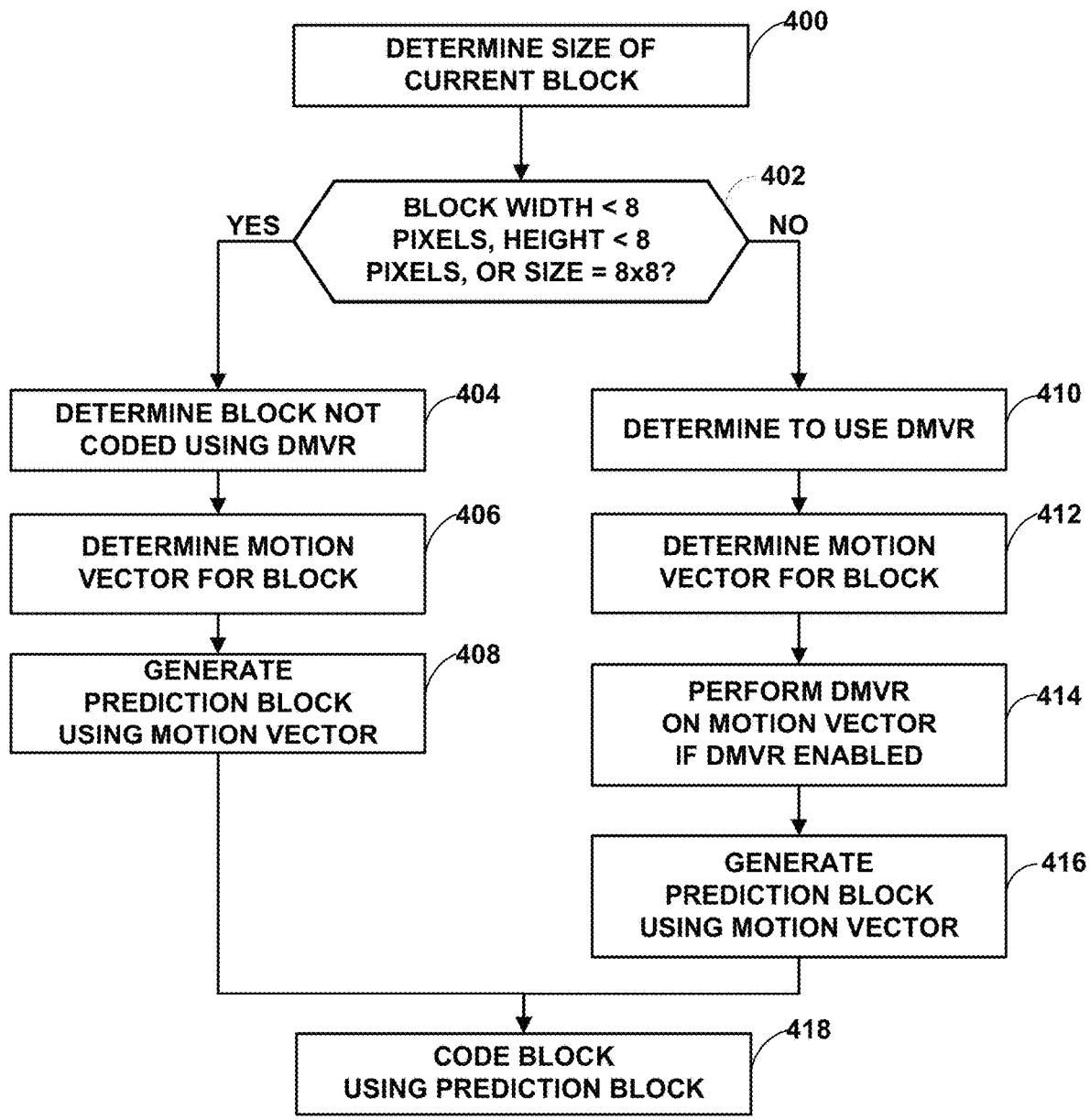
FIG. 18 is a flowchart illustrating an example of a method of coding a block of video data according to the techniques of this disclosure.

FIG. 18 is a flowchart illustrating an example of a method of coding a block of video data according to the techniques of this disclosure. The method of FIG. 18 may be performed by a video coding device, such as video encoder 200 or video decoder 300. For purposes of example, the method of FIG. 18 is described with respect to video decoder 300, although other video coding devices, such as video encoder 200, may perform this or a similar method.

Initially, video decoder 300 determines a size of a block (400). For example, video decoder 300 may decode a tree structure associated with a coding tree unit (CTU) to determine splits in the tree structure, ultimately identifying a leaf node of the tree structure. Using the number of splits, tree types, and types of splits, video decoder 300 may determine a size of the block, e.g., a width and a height of the block in units of pixels. When performed by video encoder 200, video encoder 200 may determine a size of the block by testing various different block sizes and partitioning patterns of the CTU to determine a partitioning of the CTU that results in a best-performing rate-distortion value.

Video decoder 300 may then determine whether any of the width of the block is less than 8 pixels, the height of the block is less than 8 pixels, or the size of the block is equal to 8×8 (482). If any of these is true ("YES" branch of 402), video decoder 300 may determine that the block is not coded using DMVR (404). Accordingly, video decoder 300 may proceed to determine a motion vector for the block (406), e.g., by decoding the block, and then generate a prediction block for the block using the motion vector (408).

On the other hand, if the block has a size of at least 8×8 with at least one of the width or the height being more than 8 pixels (i.e., a size of at least 8×N or N×8 where N is an integer greater than 8) ("NO" branch of 402), video decoder 300 may determine to perform DMVR for the block, e.g., based on the determination of the size and/or using additional criteria (410). In some examples, the other criteria may indicate that DMVR is not to be performed. Video decoder 300 may determine a motion vector for the block (412), perform DMVR on the motion vector if the other criteria indicate that DMVR is enabled (414), and generate the prediction block using the (potentially refined) motion vector (416).

In either case (that is, following either step 408 or 416), video decoder 300 may then code (i.e., decode, in this example) the block using the prediction block (418).

In this manner, FIG. 18 represents an example of a method of coding (encoding or decoding) a block of video data including determining that a block of video data has at least one of a width less than 8 pixels, a height less than 8 pixels, or the width and the height being equal to 8 pixels; in response to determining that the block of video data has the at least one of the width less than 8 pixels, the height less than 8 pixels, or the width and the height being equal to 8 pixels, determining that the block is not coded using decoder-side motion vector refinement (DMVR); and in response to determining that the block is not coded using DMVR, coding the block without performing DMVR for the block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry" as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
  determining that a block of video data has one of: 1) a width of 4 pixels and a height of more than 8 pixels or 2) a height of 4 pixels and a width of more than 8 pixels;
  in response to determining that the block of video data has the one of 1) the width of 4 pixels and the height of more than 8 pixels or 2) the height of 4 pixels and the width of more than 8 pixels, determining that decoder-side motion vector refinement (DMVR) is not available to be used for the block; and
  in response to determining that DMVR is not available to be used for the block, coding the block without performing DMVR for the block.

2. The method of claim 1, wherein the block comprises a first block, the method further comprising:
  determining that a second block of video data has a size of at least 8×N or N×8, wherein N is an integer value greater than 8;
  in response to determining that the second block of video data has the size of at least 8×N or N×8, determining whether to code the second block using DMVR;
  in response to determining to code the second block using DMVR, coding the second block using DMVR.

3. The method of claim 2, wherein coding the second block comprises:
  retrieving padded filter input samples of a reference picture for the second block when the second block is to be predicted using bi-directional optical flow (BIO);
  calculating one or more gradient values for one or more samples of the second block using the padded filter input samples;
  calculating one or more refined motion vectors for the one or more samples of the second block using the gradient values; and
  generating a prediction block for the second block using the one or more refined motion vectors.

4. The method of claim 3, wherein the second block comprises a width of w samples and a height of h samples, and wherein retrieving the padded filter input samples comprises retrieving (w+7)*(h+7) samples from the reference picture and padding the retrieved samples to a size of (w+7+2d)*(h+7+2d), wherein d represents a pre-defined maximum displacement vector.

5. The method of claim 3, wherein calculating the one or more gradient values comprises calculating the one or more gradient values using a gradient filter having a length of L, wherein the second block comprises a width of w samples and a height of h samples, and wherein retrieving the padded filter input samples comprises retrieving (w+7)*(h+7) samples from the reference picture and padding the retrieved samples to a size of (w+7+2d+2s)*(h+7+2d+2s), wherein d represents a pre-defined maximum displacement vector, and wherein s represents one-half of L.

6. The method of claim 3, wherein the second block comprises a width of w samples and a height of h samples, and wherein retrieving the padded filter input samples comprises:
  retrieving (w+7)*(h+7) samples from the reference picture;
  horizontally padding the retrieved samples to a size of (w+11)*(h+7);
  horizontally interpolating the padded samples to a size of (w+11−t)*(h+7); and
  vertically padding the horizontally interpolated padded samples to a size of (w+11−t)*(h+11).

7. The method of claim 3, further comprising decoding an initial motion vector for the second block, wherein calculating the one or more refined motion vectors comprises calculating the one or more refined motion vectors using the initial motion vector.

8. The method of claim 1, wherein coding the block comprises:
decoding a motion vector for the block;
calculating a prediction block for the block using the motion vector;
decoding a residual block for the block; and
combining the prediction block with the residual block to decode the block.

9. The method of claim 1, wherein coding the block comprises:
generating a motion vector for the block;
calculating a prediction block for the block using the motion vector;
generating a residual block for the block representing differences between the block and the prediction block; and
encoding the residual block and the motion vector to encode the block.

10. The method of claim 1, wherein coding the block comprises:
retrieving a refined motion vector of an above-right neighboring block to the block as a motion vector predictor for a motion vector of the block;
generating the motion vector for the current block using the motion vector predictor; and
generating a prediction block for the block using the motion vector.

11. The method of claim 1, wherein coding the block comprises:
retrieving a refined motion vector of a virtual pipeline data unit (VPDU) neighboring the block as a motion vector predictor for a motion vector of the block, wherein the VPDU comprises one of four VPDUs of a coding tree unit (CTU), wherein the four VPDUs are evenly split quarter blocks of the CTU;
generating the motion vector for the current block using the motion vector predictor; and
generating a prediction block for the block using the motion vector.

12. The method of claim 1, wherein coding the block comprises:
generating a history-based motion vector prediction (HMVP) list including one or more motion vector predictor candidates for a motion vector of the block;
in response to decoding a previous block using a refined motion vector, wherein an affine flag for the previous block indicates that affine motion is disabled for the previous block, preventing insertion of the refined motion vector into the HMVP list;
coding the motion vector for the block using one of the motion vector predictor candidates of the HMVP list; and
generating a prediction block for the block using the motion vector.

13. The method of claim 1, wherein coding the block comprises:
generating a history-based motion vector prediction (HMVP) list including one or more motion vector predictor candidates for a motion vector of the block;
in response to decoding a previous block using a refined control point motion vector, wherein an affine flag for the previous block indicates that affine motion is enabled for the previous block, preventing insertion of the refined control point motion vector into the HMVP list;
coding the motion vector for the block using one of the motion vector predictor candidates of the HMVP list; and
generating a prediction block for the block using the motion vector.

14. The method of claim 1, wherein coding the block comprises:
determining an affine merge candidate for a motion vector of the block from a causal neighboring sub-block to the block, wherein determining the affine merge candidate comprises:
when the causal neighboring sub-block is in an above-neighboring coding tree unit (CTU) row to a CTU row including the block, selecting a refined motion vector of the causal neighboring sub-block as the affine merge candidate; or
when the causal neighboring sub-block is in the CTU row including the block, selecting an unrefined motion vector used to generate the refined motion vector as the affine merge candidate;
coding the motion vector using the affine merge candidate; and
generating a prediction block for the block using the motion vector.

15. The method of claim 1, wherein coding the block comprises:
determining a positive integer scalar (s) value to be applied to weight values used to calculate a cost value using a cost function;
calculating the cost value using the cost function and the s value for a sample of a prediction block of the block; and
generating the prediction block using the cost value according to at least one of generalized bi-prediction (GBi) or weighted bi-prediction (WP).

16. The method of claim 15, wherein determining the s value comprises:
determining s=8 for GBi;
determining $s=2^{luma\_log2\_weight\_denom+Max(2,\ 14-LumaBitDepth)}$ for luma WP; or
determining $s=2^{luma\_log2\_weight\_denom-delta\_chroma\_log2\_weight\_denom+Max(2,\ 14-ChromaBitDepth)}$ for chroma WP.

17. A device for coding video data, the device comprising:
a memory configured to store video data; and
one or more processors implemented in circuitry and configured to:
determine that a block of video data has one of: 1) a width of 4 pixels and a height of more than 8 pixels or 2) a height of 4 pixels and a width of more than 8 pixels;
in response to determining that the block of video data has the one of 1) the width of 4 pixels and the height of more than 8 pixels or 2) the height of 4 pixels and the width of more than 8 pixels, determine that decoder-side motion vector refinement (DMVR) is not available to be used for the block; and
in response to determining that DMVR is not available to be used for the block, code the block without performing DMVR for the block.

18. The device of claim 17, wherein the block comprises a first block, and wherein the one or more processors are further configured to:

determine that a second block of video data has a size of at least 8×N or N×8, wherein N is an integer value greater than 8;

in response to determining that the second block of video data has the size of at least 8×N or N×8, determine whether to code the second block using DMVR;

in response to determining to code the second block using DMVR, code the second block using DMVR.

19. The device of claim 18, wherein to code the second block, the one or more processors are configured to:

retrieve padded filter input samples of a reference picture for the second block when the second block is to be predicted using bi-directional optical flow (BIO);

calculate one or more gradient values for one or more samples of the second block using the padded filter input samples;

calculate one or more refined motion vectors for the one or more samples of the second block using the gradient values; and generate a prediction block for the second block using the one or more refined motion vectors.

20. The device of claim 17, wherein to code the block, the one or more processors are configured to:

decode a motion vector for the block;

calculate a prediction block for the block using the motion vector;

decode a residual block for the block; and combine the prediction block with the residual block to decode the block.

21. The device of claim 17, wherein to code the block, the one or more processors are configured to:

generate a motion vector for the block;

calculate a prediction block for the block using the motion vector;

generate a residual block for the block representing differences between the block and the prediction block; and encode the residual block and the motion vector to encode the block.

22. The device of claim 17, wherein to code the block, the one or more processors are configured to:

retrieve a refined motion vector of an above-right neighboring block to the block as a motion vector predictor for a motion vector of the block;

generate the motion vector for the current block using the motion vector predictor; and generate a prediction block for the block using the motion vector.

23. The device of claim 17, wherein to code the block, the one or more processors are configured to:

retrieve a refined motion vector of a virtual pipeline data unit (VPDU) neighboring the block as a motion vector predictor for a motion vector of the block, wherein the VPDU comprises one of four VPDUs of a coding tree unit (CTU), wherein the four VPDUs are evenly split quarter blocks of the CTU;

generate the motion vector for the current block using the motion vector predictor; and generate a prediction block for the block using the motion vector.

24. The device of claim 17, wherein to code the block, the one or more processors are configured to:

generate a history-based motion vector prediction (HMVP) list including one or more motion vector predictor candidates for a motion vector of the block;

in response to decoding a previous block using a refined motion vector, wherein an affine flag for the previous block indicates that affine motion is disabled for the previous block, prevent insertion of the refined motion vector into the HMVP list;

code the motion vector for the block using one of the motion vector predictor candidates of the HMVP list; and generate a prediction block for the block using the motion vector.

25. The device of claim 17, wherein to code the block, the one or more processors are configured to:

generate a history-based motion vector prediction (HMVP) list including one or more motion vector predictor candidates for a motion vector of the block;

in response to decoding a previous block using a refined control point motion vector, wherein an affine flag for the previous block indicates that affine motion is enabled for the previous block, prevent insertion of the refined control point motion vector into the HMVP list;

code the motion vector for the block using one of the motion vector predictor candidates of the HMVP list; and generate a prediction block for the block using the motion vector.

26. The device of claim 17, wherein to code the block, the one or more processors are configured to:

determine an affine merge candidate for a motion vector of the block from a causal neighboring sub-block to the block, wherein to determine the affine merge candidate, the one or more processors are configured to:

when the causal neighboring sub-block is in an above-neighboring coding tree unit (CTU) row to a CTU row including the block, select a refined motion vector of the causal neighboring sub-block as the affine merge candidate; or when the causal neighboring sub-block is in the CTU row including the block, select an unrefined motion vector used to generate the refined motion vector as the affine merge candidate;

code the motion vector using the affine merge candidate; and generate a prediction block for the block using the motion vector.

27. The device of claim 17, wherein to code the block, the one or more processors are configured to:

determine a positive integer scalar (s) value to be applied to weight values used to calculate a cost value using a cost function;

calculate the cost value using the cost function and the s value for a sample of a prediction block of the block; and generate the prediction block using the cost value according to at least one of generalized bi-prediction (GBi) or weighted bi-prediction (WP).

28. The device of claim 17, further comprising a display configured to display the video data.

29. The device of claim 17, wherein the device comprises one or more of a camera, a computer, a mobile device, a broadcast receiver device, or a set-top box.

30. A non-transitory computer-readable storage medium having stored thereon instructions that, when executed, cause a processor to:

determine that a block of video data has one of: 1) a width of 4 pixels and a height of more than 8 pixels or 2) a height of 4 pixels and a width of more than 8 pixels;

in response to determining that the block of video data has the one of 1) the width of 4 pixels and the height of more than 8 pixels or 2) the height of 4 pixels and the width of more than 8 pixels, determine that decoder-side motion vector refinement (DMVR) is not available to be used for the block; and in response to determining that DMVR is not available to be used for the block, code the block without performing DMVR for the block.

31. The non-transitory computer-readable storage medium of claim 30, wherein the block comprises a first block, further comprising instructions that cause the processor to:

determine that a second block of video data has a size of at least 8×N or N×8, wherein N is an integer value greater than 8;

in response to determining that the second block of video data has the size of at least 8×N or N×8, determine whether to code the second block using DMVR;

in response to determining to code the second block using DMVR, code the second block using DMVR.

32. The non-transitory computer-readable storage medium of claim 30, wherein the instructions that cause the processor to code the block comprise instructions that cause the processor to:

decode a motion vector for the block;

calculate a prediction block for the block using the motion vector;

decode a residual block for the block; and combine the prediction block with the residual block to decode the block.

33. The non-transitory computer-readable storage medium of claim 30, wherein the instructions that cause the processor to code the block comprise instructions that cause the processor to:

generate a motion vector for the block;

calculate a prediction block for the block using the motion vector;

generate a residual block for the block representing differences between the block and the prediction block; and encode the residual block and the motion vector to encode the block.

34. A device for coding video data, the device comprising:

means for determining that a block of video data has one of: 1) a width of 4 pixels and a height of more than 8 pixels or 2) a height of 4 pixels and a width of more than 8 pixels;

means for determining that decoder-side motion vector refinement (DMVR) is not available to be used for the block in response to determining that the block of video data has the one of 1) the width of 4 pixels and the height of more than 8 pixels or 2) the height of 4 pixels and the width of more than 8 pixels; and means for coding the block without performing DMVR for the block in response to determining that DMVR is not available to be used for the block.

35. The device of claim 34, wherein the block comprises a first block, the device further comprising:

means for determining that a second block of video data has a size of at least 8×N or N×8, wherein N is an integer value greater than 8;

means for determining whether to code the second block using DMVR in response to determining that the second block of video data has the size of at least 8×N or N×8;

means for coding the second block using DMVR in response to a determination to code the second block using DMVR.

36. The device of claim 34, wherein the means for coding the block comprises:

means for decoding a motion vector for the block;

means for calculating a prediction block for the block using the motion vector;

means for decoding a residual block for the block; and means for combining the prediction block with the residual block to decode the block.

37. The device of claim 34, wherein the means for coding the block comprises:

means for generating a motion vector for the block;

means for calculating a prediction block for the block using the motion vector;

means for generating a residual block for the block representing differences between the block and the prediction block; and means for encoding the residual block and the motion vector to encode the block.

* * * * *